United States Patent
Mizutani

[11] Patent Number: 6,127,999
[45] Date of Patent: Oct. 3, 2000

[54] GRAPHIC IMAGE DISPLAY APPARATUS WITH HIGH SPEED INVERSION OF GRAPHIC IMAGE

[75] Inventor: Kenichi Mizutani, Kanagawa, Japan

[73] Assignee: NEC Corporation, Tokyo, Japan

[21] Appl. No.: 08/903,436

[22] Filed: Jul. 30, 1997

[30] Foreign Application Priority Data

Jul. 30, 1996 [JP] Japan ................................. 8-200668

[51] Int. Cl.[7] ........................................................ G09G 5/34
[52] U.S. Cl. ............................. 345/121; 345/131; 345/24
[58] Field of Search ............................... 345/33, 127, 128, 345/131, 121, 194, 192, 137, 24, 521, 203, 193, 509; 395/109

[56] References Cited

U.S. PATENT DOCUMENTS 5,479,525  12/1995  Nakamura et al. .

FOREIGN PATENT DOCUMENTS 0 582 824   2/1994   European Pat. Off. .
58-2877     1/1983   Japan .
60-78478    5/1985   Japan .
62-192793   8/1987   Japan .
63-35163    3/1988   Japan .
1-259398    10/1989  Japan .
6-167966    6/1994   Japan .
6-195046    7/1994   Japan .

Primary Examiner—Steven J. Saras
Assistant Examiner—Alecia D. Nelson
Attorney, Agent, or Firm—Young & Thompson

[57] ABSTRACT

In a graphic image display apparatus including a CPU, a line buffer for temporarily storing graphic data for display, and a display control circuit connected between the CPU and the line buffer, the display control circuit is formed by a graphic ROM for storing source data for graphics to be displayed and designed to output graphic data for display in response to an interface signal of said CPU, and an output circuit having at least one of a data dot selecting circuit for changing a dot order of the graphic data for display and a line buffer address changing circuit for changing a line buffer address representing a storage address of the graphic data for display to be supplied to the line buffer.

9 Claims, 30 Drawing Sheets

Fig. 4 PRIOR ART

| ADD | | |
|---|---|---|
| 0(h) | 2AA0(h) | |
| 1(h) | 5558(h) | |
| 2(h) | BFF4(h) | |
| 3(h) | 57FE(h) | |
| 4(h) | BC06(h) | G1 |
| 5(h) | 6E22(h) | |
| 6(h) | F820(h) | |
| 7(h) | CFE0(h) | |
| 8(h) | C830(h) | |
| 9(h) | C828(h) | |
| A(h) | E004(h) | |
| B(h) | F13C(h) | |
| C(h) | 71E0(h) | |
| D(h) | 7830(h) | |
| E(h) | 2C10(h) | |
| F(h) | 27F0(h) | |
| 10(h) | 0554(h) | |
| 11(h) | 1AAA(h) | |
| 12(h) | 2FFD(h) | |
| 13(h) | 7FFA(h) | |
| 14(h) | 603D(h) | G2 |
| 15(h) | 4476(h) | |
| 16(h) | 041F(h) | |
| 17(h) | 07F3(h) | |
| 18(h) | 0C13(h) | |
| 19(h) | 1413(h) | |
| 1A(h) | 2007(h) | |
| 1B(h) | 3C8F(h) | |
| 1C(h) | 078E(h) | |
| 1D(h) | 0C1R(h) | |
| 1E(h) | 0834(h) | |
| 1F(h) | 0FE4(h) | |
| 20(h) | 27F0(h) | |
| 21(h) | 2C10(h) | |
| 22(h) | 7830(h) | |
| 23(h) | 71E0(h) | |
| 24(h) | F13C(h) | G3 |
| 25(h) | E004(h) | |
| 26(h) | C828(h) | |
| 27(h) | C830(h) | |
| 28(h) | CFF0(h) | |
| 29(h) | F820(h) | |
| 2A(h) | 6E22(h) | |
| 2B(h) | BC06(h) | |
| 2C(h) | 57FE(h) | |
| 2D(h) | BFF4(h) | |
| 2E(h) | 5558(h) | |
| 2F(h) | 2AA0(h) | |
| 30(h) | | |

36

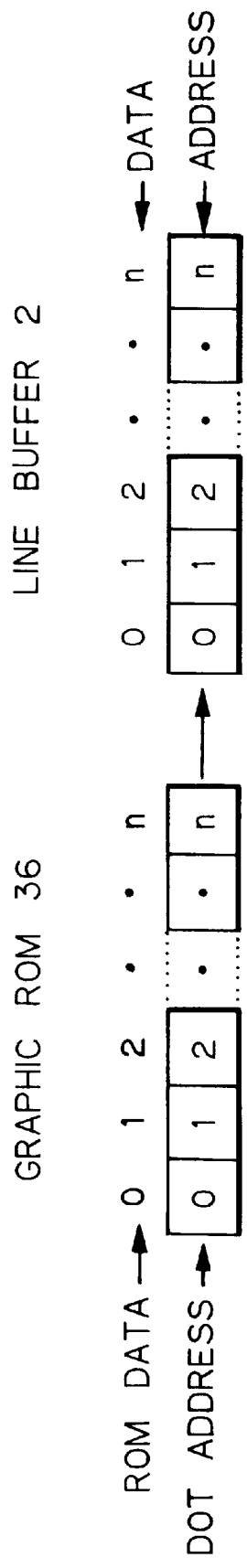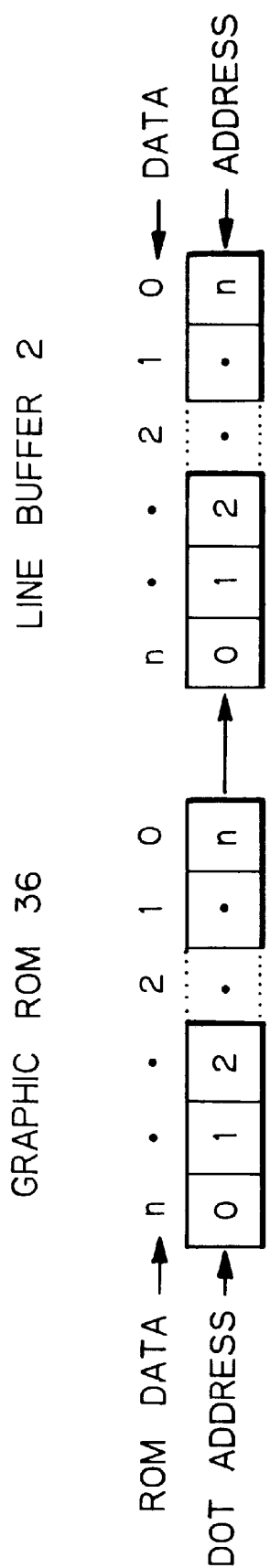

Fig. 13 PRIOR ART

| ADD | | |
|---|---|---|
| 0(h) | 2AA0(h) | |
| 1(h) | 5558(h) | |
| 2(h) | BFF4(h) | |
| 3(h) | 57FE(h) | |
| 4(h) | BC06(h) | |
| 5(h) | 6E22(h) | |
| 6(h) | F820(h) | |
| 7(h) | CFE0(h) | |
| 8(h) | C830(h) | |
| 9(h) | C828(h) | |
| A(h) | E004(h) | |
| B(h) | F13C(h) | |
| C(h) | 71E0(h) | |
| D(h) | 7830(h) | |
| E(h) | 2C10(h) | |
| F(h) | 27F0(h) | |

G1

| 20(h) | 27F0(h) |
| 21(h) | 2C10(h) |
| 22(h) | 7830(h) |
| 23(h) | 71E0(h) |
| 24(h) | F13C(h) |
| 25(h) | E004(h) |
| 26(h) | C828(h) |
| 27(h) | C830(h) |
| 28(h) | CFF0(h) |
| 29(h) | F820(h) |
| 2A(h) | 6E22(h) |
| 2B(h) | BC06(h) |
| 2C(h) | 57FE(h) |
| 2D(h) | BFF4(h) |
| 2E(h) | 5558(h) |
| 2F(h) | 2AA0(h) |
| 30(h) | |

G3

36

GRAPHIC IMAGE DISPLAY APPARATUS WITH HIGH SPEED INVERSION OF GRAPHIC IMAGE

BACKGROUND OF THE INVENTION

1. Field of the Invention

The present invention relates to a graphic image display apparatus and, more particularly, a graphic image display apparatus suitably used in game machines adapted to carrying out a high speed up/down and/or right/left inversion of a specific graphic image and displaying the inverted image.

2. Description of the Related Art

Recently, as game machines adapted to highly sophisticated games are developed, graphic image display apparatuses of the type under consideration are required to have various special functions for effective presentation of images to players. Such special functions may include the function of laterally inverting (right/left inversion) the image of a character of the game and displaying it with the original image of the character simultaneously on the screen.

In a first prior art graphic image display apparatus, data for a graphic to be displayed and data for an inverted graphic thereof on a graphic read-only memory (ROM) are mapped as independent sets of data. This will be explained later in detail. As a result, the volume of data to be stored in the graphic ROM increases proportionally relative to the desired number of inverted graphics which consequently requires a large circuit. In addition, as the storage capacity of the graphic ROM increases, the power consumption of the graphic image display apparatus also increases.

In a second prior art graphic image display apparatus (see JP-A-62-192793), graphic data for display is temporarily stored in a shift register, a normal graphic display and a right/left inverted graphic display are carried out by storing them in a line buffer in a descending order or in an ascending order.

In the second prior art graphic image display apparatus, however, since the original graphic can be inverted only right/left, it is impossible to invert or replace selected dots in the original graphic nor is it possible to display only selected dots of the original graphic.

SUMMARY OF THE INVENTION

It is an object of the present invention to provide a modified graphic image display apparatus capable of a high speed inversion of graphic images.

According to the present invention, in a graphic image display apparatus including a CPU, a line buffer for temporarily storing graphic data for display, and a display control circuit connected between the CPU and the line buffer, the display control circuit is formed by a graphic ROM for storing source data for graphics to be displayed and designed to output graphic data for display in response to an interface signal of the CPU, and an output circuit having at least one of a data dot selecting circuit and a line buffer address changing circuit. The data dot selecting circuit changes a dot order of the graphic data for display and the line buffer address changing circuit changes a line buffer address representing a storage address of the graphic data for display to be supplied to the line buffer.

BRIEF DESCRIPTION OF THE DRAWINGS

The present invention will be more clearly understood from the description as set forth below, as compared with the prior art, with reference to the accompanying drawings, wherein:

FIG. 4 is an illustration of mapping the allocation of the graphic ROM of FIG. 2;

FIGS. 9A and 9B are diagrams for showing the principle of the operation of the apparatus of FIG. 2;

FIG. 13 is an illustration of mapping the allocation of the graphic ROM of FIG. 10;

DESCRIPTION OF THE PREFERRED EMBODIMENTS

Before the description of the preferred embodiments, prior art graphic image display apparatuses will be explained with reference to FIGS. 1 through 8, 9A, 9B, and 10 through 14.

Figure 1:
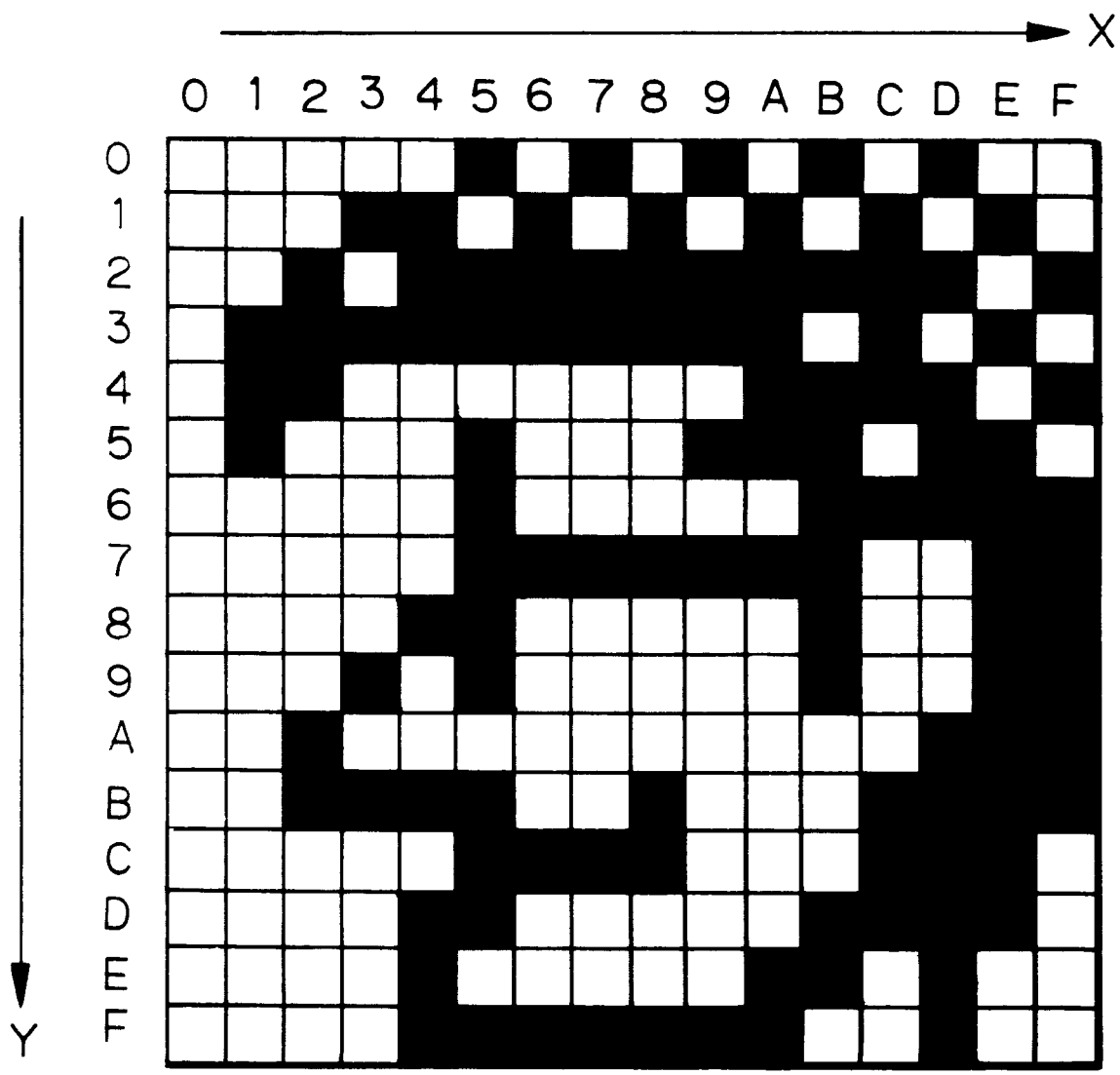
FIG. 1 is a diagram illustrating an example of graphic data.

In FIG. 1, which illustrates an example of a graphic image, this graphic image is displayed by 16 (vertical)×16 (horizontal) dots. In this case, an address provided along an X direction is referred to as a dot address, and an address provided along a Y direction is referred to as a graphic address. Also, the top leftmost dot is referred to as an origin of data of this graphic image.

Figure 2:
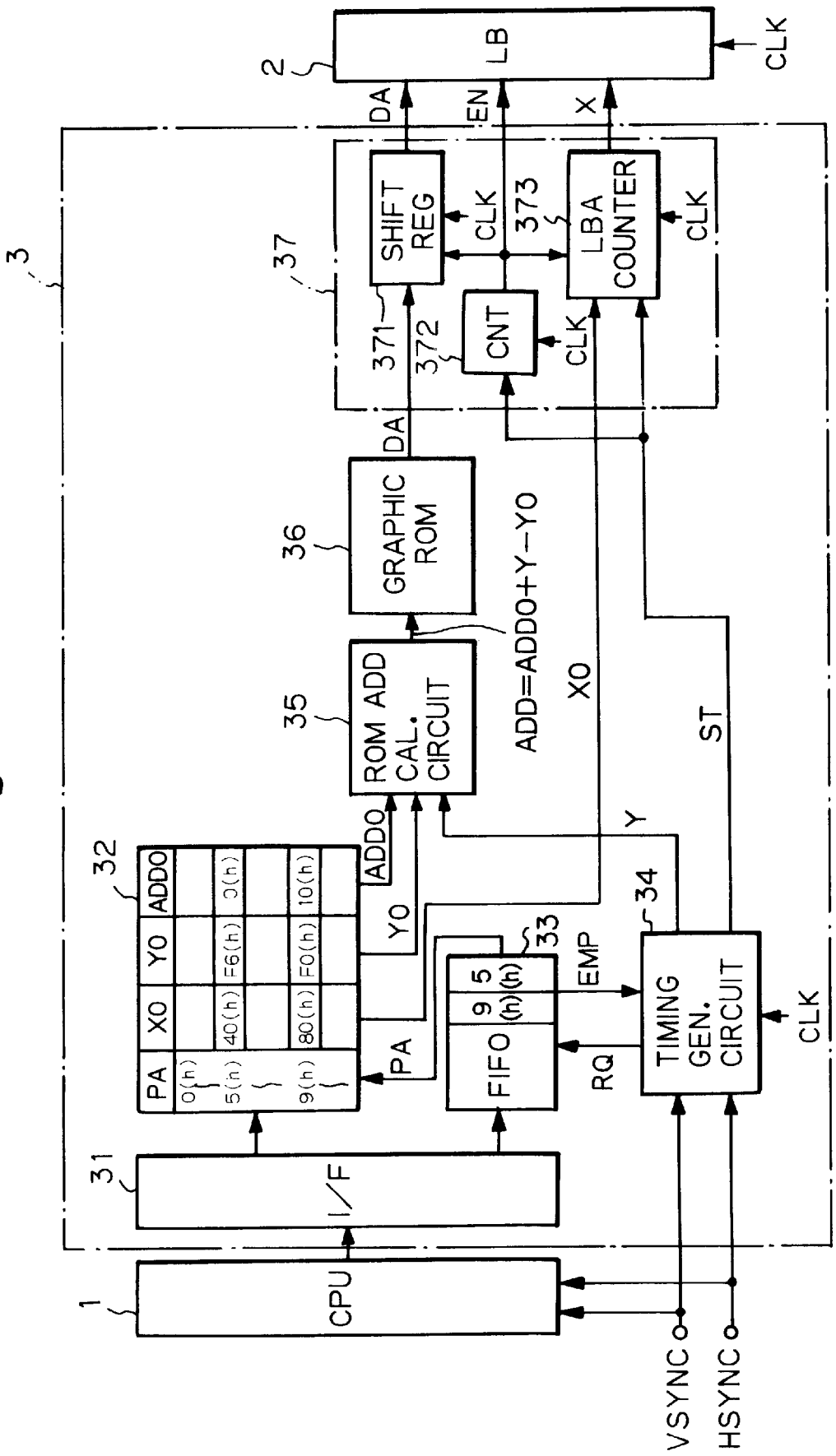
FIG. 2 is a block circuit diagram illustrating a first prior art graphic image display apparatus.

In FIG. 2, which is a block diagram illustrating a first prior art graphic image display apparatus, reference numeral 1 designates a central processing unit (CPU) for controlling the entire apparatus, and 2 designates a line buffer for temporarily storing graphic data of a scan line of the apparatus for display. A display control circuit 3 is connected between the CPU 1 and the line buffer 2, for carrying out a display processing operation in response to the output signal of the CPU 1 to produce graphic data for display. A vertical synchronization signal VSYNC and a horizontal synchronization signal HSYNC are supplied to the CPU 1 and the display control circuit 3.

The display control circuit 3 is formed by a data interface 31 which is connected to a parameter random access memory (RAM) 32 and a first-in first-out (FIFO) 33. The FIFO 33 stores addresses PA for the parameter RAM 32.

Figure 3:
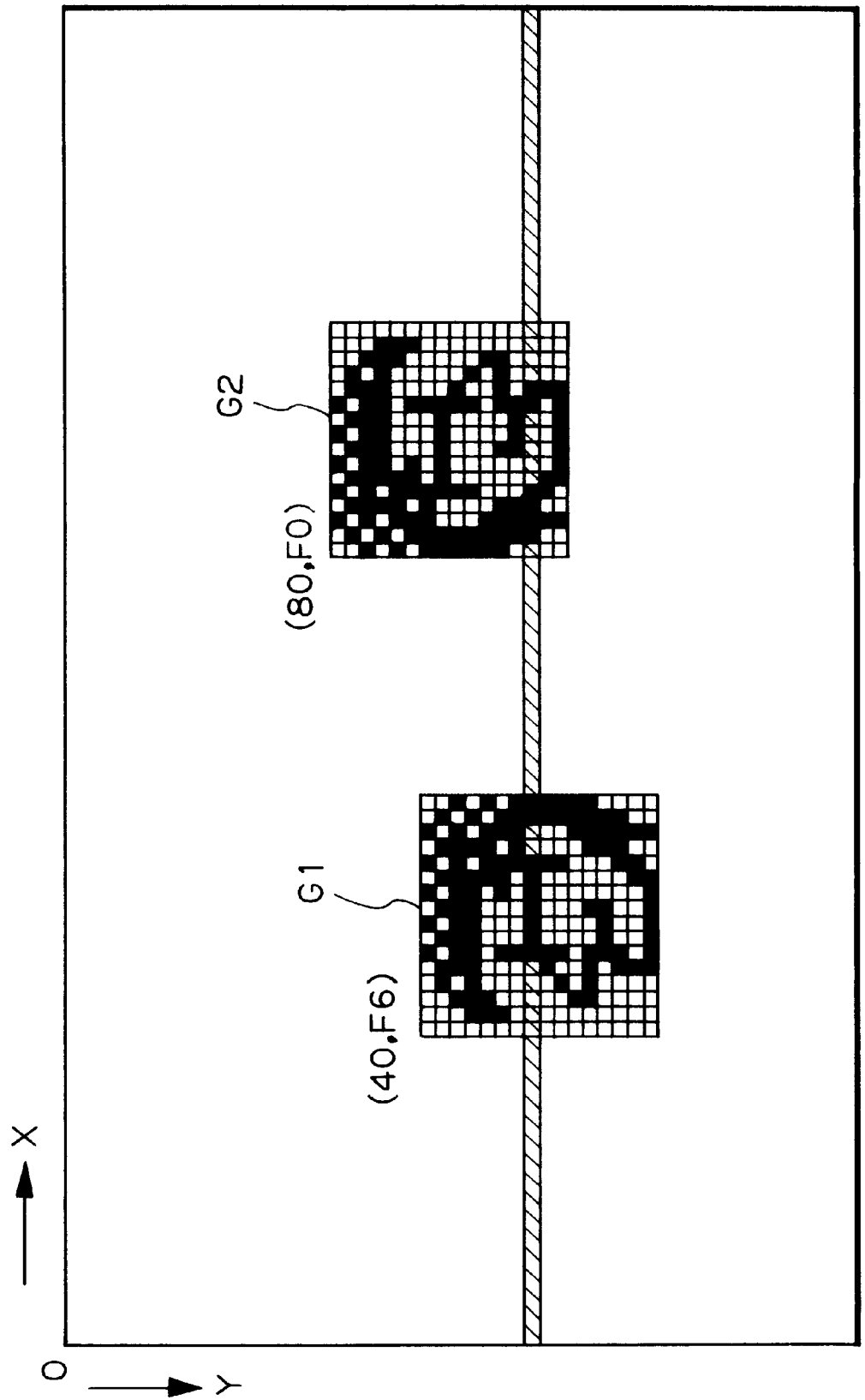
FIG. 3 is an illustration of graphics that can be displayed by the apparatus of FIG. 2.

The parameter RAM 32 stores graphic data for one frame. For example, as shown in FIG. 3, if the parameter RAM 32 stores two graphic images G1 and G2, the parameter RAM 32 stores an origin coordinate (X0, Y0)=(40, F6) for the graphic image G1 designated by a ROM address ADD0=0 (h) and an origin coordinate (X0, Y0)=(80, F0) for the graphic image G2 designated by a ROM address ADD0=10 (h). The ROM address ADD0 will be explained later.

When the FIFO 33 receives a request signal RQ from a timing generating circuit 34, the FIFO 33 generates an address PA and transmits it to the parameter RAM 32. After that, the FIFO 33 generates an empty signal EMP and transmits it to the timing generating circuit 34.

Also, the display control circuit 3 includes a ROM address calculating circuit 35 and a graphic ROM 36. The ROM address calculating circuit 35 calculates a ROM address ADD by

ADD=ADD0+Y−Y0 where Y is a scan line address supplied from the timing generating circuit 34.

Graphic display data DA generated from the graphic ROM 36 is transmitted via an output circuit 37 clocked by a clock signal CLK to the line buffer 2. In more detail, the output circuit 37 is formed by a shift register 371 for transmitting the graphic display data DA to the line buffer 2, a counter 372 for receiving a display start signal ST from the timing generating circuit 34 to generate an enable signal EN, and a line buffer address counter 373 for receiving the X origin coordinate X0 of the graphic image and the display start signal ST to generate a line buffer address X. In more detail, when the counter 372 receives the display start signal ST, the counter 372 activates the enable signal EN (EN="0") for a predetermined time period. Also, the X origin coordinate X0 is preset in the line buffer address counter 373 by receiving the display start signal ST, and thereafter, the content of the line buffer 2 is counted up by receiving the clock signal CLK. Therefore, the content of the line buffer address counter 373 is changed as shown below:

X0→X0+1→X0+2→ . . .

Note that the enable signal EN continues for the predetermined time period. Therefore, when this predetermined time period has passed, the operations of the shift register 371 and the line buffer address counter 373 are both stopped. For this purpose, the counter 372 can be constructed by a 5-bit counter, and in this case, the 5 output bits are reset by receiving the display start signal ST to generate the enable signal EN by using the most significant bit (MSB). Then, upon receipt of 16 pulses of the clock signal CLK, the MSB is set so that the enable signal EN is deactivated by the MSB.

In FIG. 4, which shows an example of the content of the graphic ROM 36 of FIG. 2, three graphic images G1, G2 and G3 are stored in advance. In this case, the graphic image G2 is obtained by left/right inverting the graphic image G1, and the graphic image G3 is obtained by up/down inverting the graphic image G1.

Figure 5:
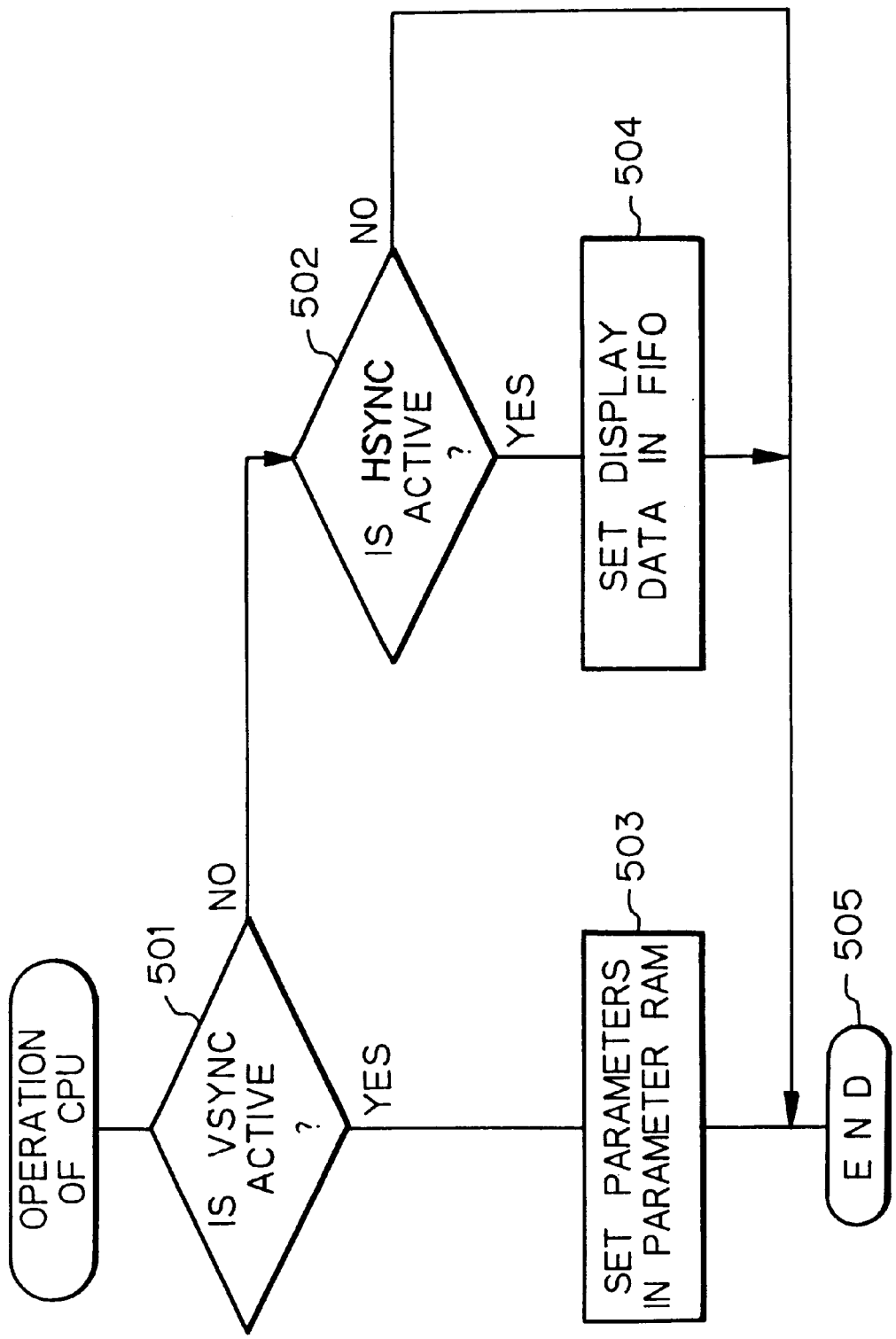
FIG. 5 is a flowchart for explaining the operation of the CPU of FIG. 2.
Figure 6:
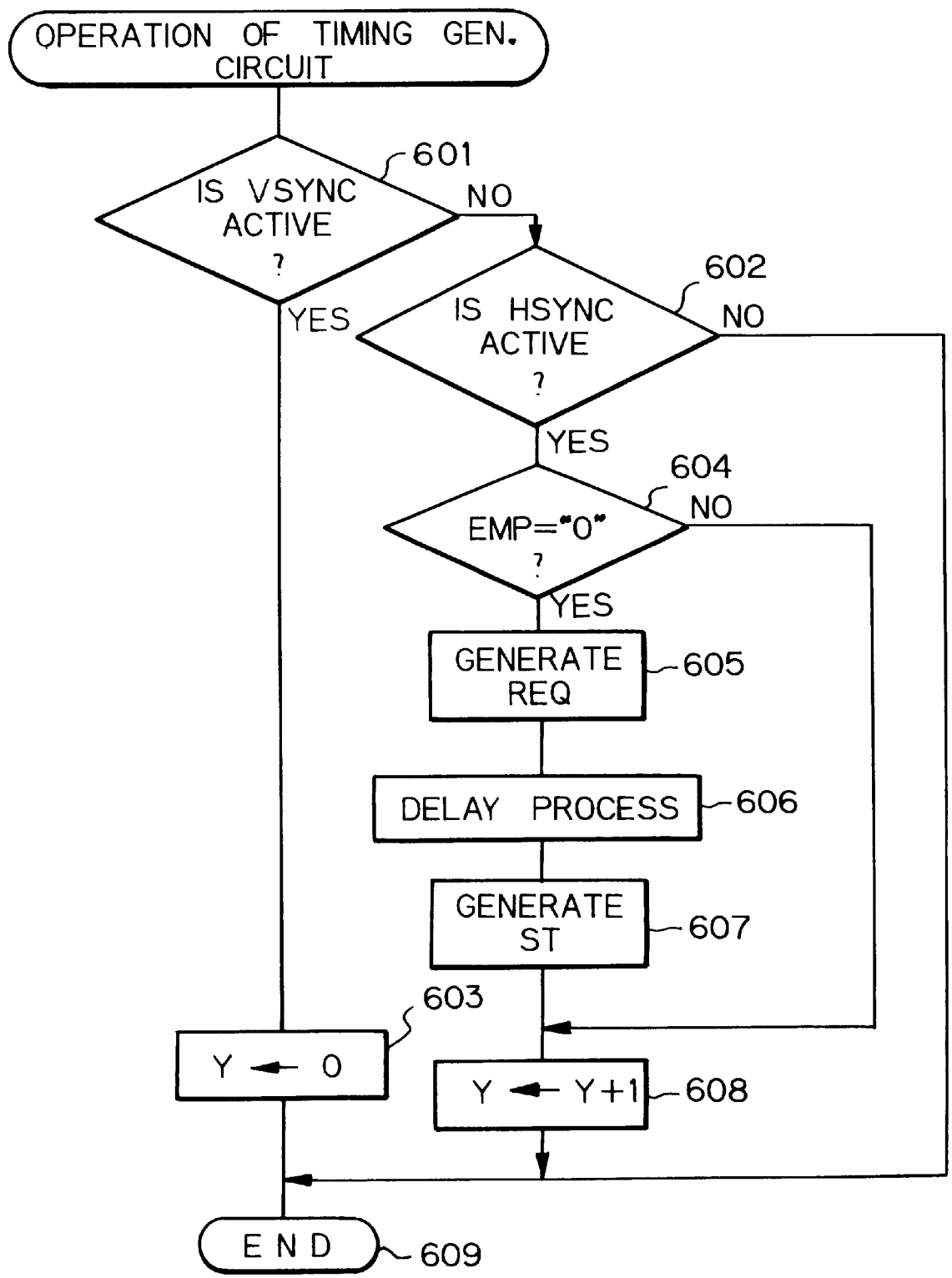
FIG. 6 is a flowchart for explaining the operation of the timing generating circuit of FIG. 2.
Figure 7:
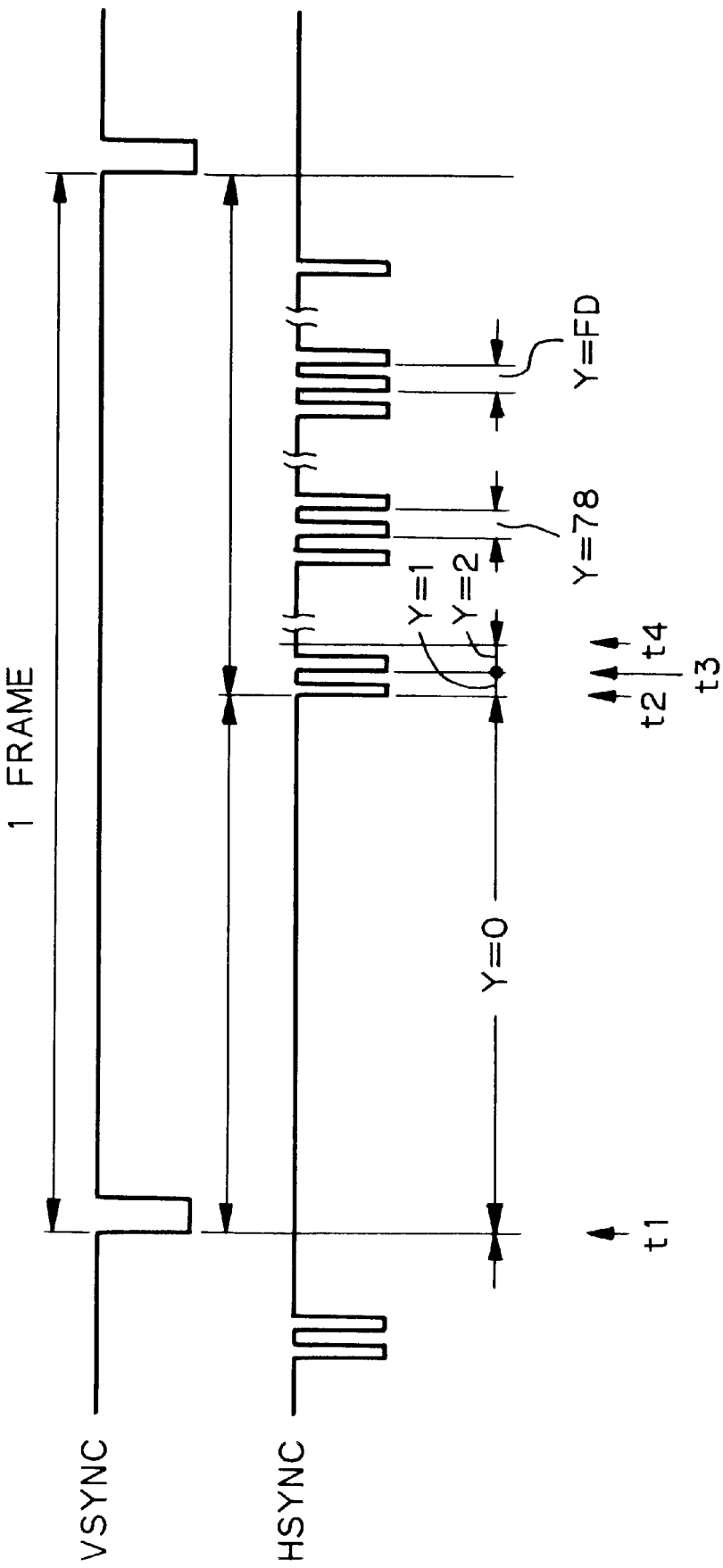
FIGS. 7 and 8 are timing diagrams for explaining the operation of the apparatus of FIG. 2.
Figure 8:
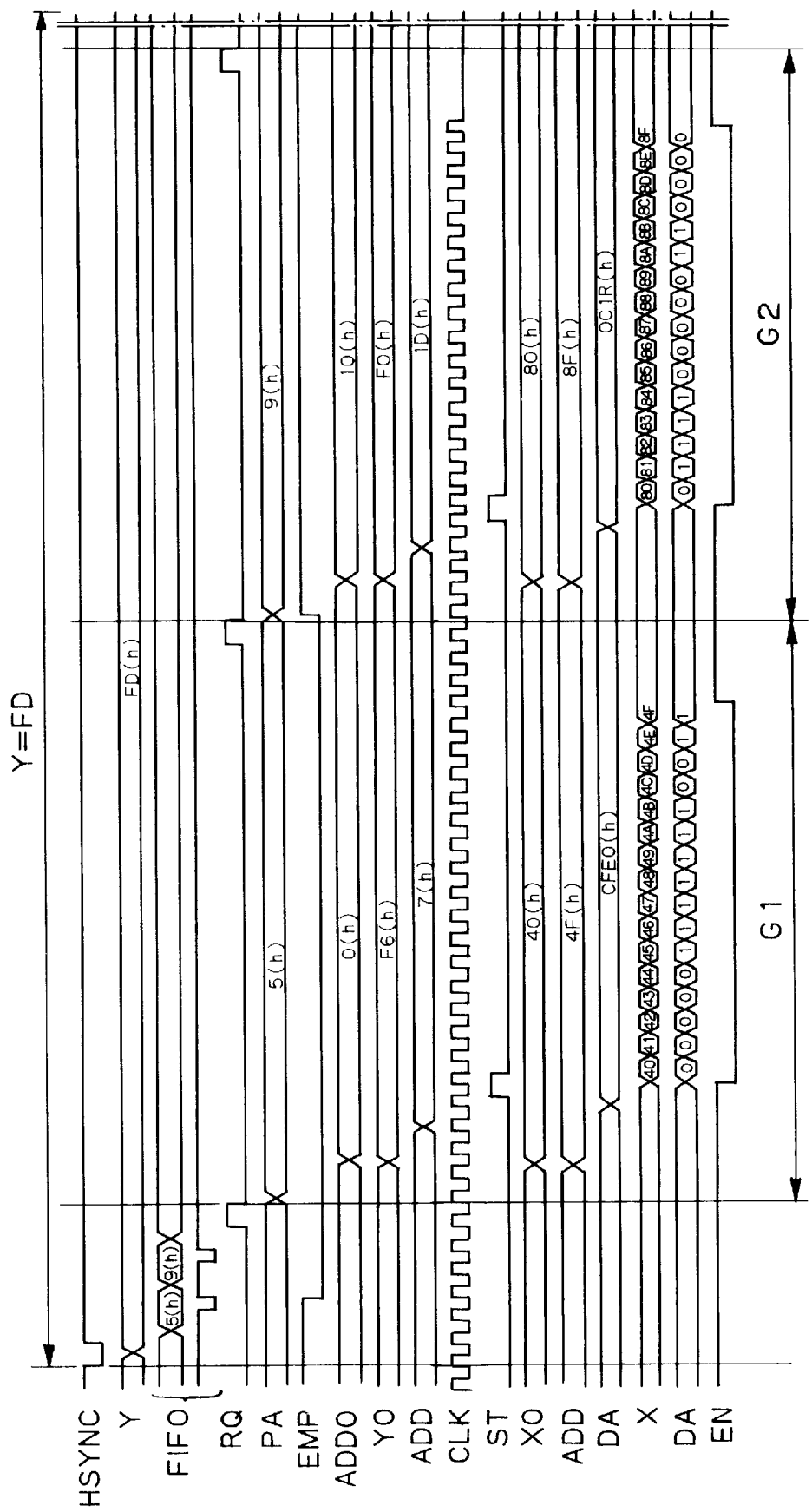

The operation of the apparatus of FIG. 2 is explained next with reference to FIGS. 5, 6, 7 and 8. Here, FIG. 5 is a flowchart for showing the operation of the CPU 1, and FIG. 6 is a flowchart for showing the operation of the timing generating circuit 34. Also, FIG. 7 is a timing diagram for showing the vertical synchronization signal VSYNC and the horizontal synchronization signal HSYNC of FIG. 2 for one frame of display data, and FIG. 8 is a timing diagram of the signal of the apparatus for one scan line.

In FIG. 5, referring to step 501, it is determined whether or not the vertical synchronization signal VSYNC is active, and in step 502, it is determined whether or not the horizontal synchronization signal HSYNC is active. As a result, only when the vertical synchronization signal VSYNC is active, does the control proceed to step 503 which sets parameters in the parameter RAM 32 via the interface 31 (see time t1 of FIG. 7), so that all graphic data for one frame is set in the parameter RAM 32. For example, in order to obtain an image as shown in FIG. 3, (X0, Y0, ADD0)=(40(h), F6(h), 0(h)) for PA=5(h)

(X0, Y0, ADD0)=(80(h), F0(h), 10(h)) for PA=9(h)

Also only when the horizontal synchronization signal HSYNC is active, does the control proceed to step 504 which sets graphic display data in the FIFO 13 for one scan line (see times t2, t3, t4, . . . of FIG. 7), so that all graphic data for one scan line is set in the FIFO 33. For example, in FIG. 3, if Y=FD(h), 5(h) and 9(h) are sequentially set in the FIFO 33. Otherwise, the control proceeds directly to step 505.

In FIG. 6, referring to step 601, it is determined whether or not the vertical synchronization signal VSYNC is active, and in step 602, it is determined whether or not the horizontal synchronization signal HSYNC is active. As a result, only when the vertical synchronization signal VSYNC is active, does the control proceed to step 603 which clears the scan line address Y (see time t1 of FIG. 7). Also, only when the horizontal synchronization signal HSYNC is active, does the control proceed to step 604. Otherwise, the control proceeds directly to step 609.

At step 604, it is determined whether or not the empty signal EMP is generated, i.e., graphic display data is present in the FIFO 33. As a result, only when graphic display data is present in the FIFO 33, does the control proceed to steps 605 through 608. Otherwise, the control proceeds directly to step 608.

At step 605, the timing generating circuit 34 generates an output request signal RQ and transmits it to the FIFO 33. As a result, the FIFO 33 generates a parameter address PA and transmits it to the parameter RAM 32. For example, as shown in FIG. 8, if the parameter address 5(h) is transmitted to the parameter RAM 32, (X0, Y0, ADD0)=(40(h), F6(h), 0(h)) is generated from the parameter RAM 32. As a result, the ROM address calculating circuit 35 calculates a ROM address ADD by $$ADD=0(h)+FD(h)-F6(h)$$
$$=7(h)$$

Therefore, for graphic image G1 and Y=FD(h) shown in FIG. 3, display data DA=CFE0(h)=(0000011111110011) is transmitted from the graphic ROM 36 to the shift register 371. Similarly, if the parameter address 9(h) is transmitted to the parameter RAM 32, (X0, Y0, ADD0)=(80(h), F0(h), 10(h)) is generated from the parameter RAM 32. As a result, the ROM address calculating circuit 35 calculates a ROM address ADD by $$ADD=10(h)+FD(h)-F0(h)$$
$$=1D(h)$$

Therefore, for graphic image G2 and Y=FD(h) shown in FIG. 3, display data DA=0C1R(h)=(0111100000110000) is transmitted from the graphic ROM 36 to the shift register 371.

Next, at step 606, a delay process by an idle step is carried but. Then, at step 607, the timing generating circuit 34 generates a display start signal ST and transmits it to the shift register 371, the counter 372 and the line buffer address counter 373. As a result, as shown in FIG. 8, if the X origin coordinate X0 is 40, the dot address X changed by the line buffer address counter 373, is 40, 41, . . . , 4F. Similarly, if the X origin coordinate X0 is 80(h), the dot address X changed by the line buffer address counter 373 is 80, 81, . . . , 8F. Thus, the display data DA (0000011111110011) is transmitted to the line buffer 2 in synchronization with the dot address X (40, 41, . . . , 4F), and the display data DA (0111100000110000) is transmitted to the line buffer 2 in synchronization with the dot address X (80, 81, . . . , 8F). In this case, the display data DA and the dot address X are both masked by the enable signal EN.

Next, at step 608, the scan line address Y is counted up by +1, i.e.,

Y=Y+1

(see times t2, t3, . . . of FIG. 7).

Then, the routine of FIG. 6 is completed by step 609. The algorithm of the graphic image display apparatus of FIG. 2 is so designed that, for displaying a graphic image and a graphic image obtained by left/right inverting the original graphic image, two separate regions are provided for the respective graphic images in the graphic ROM 36, which is then separately allocated to store respective graphic data for display by the algorithm of the apparatus. Referring to FIG. 9A, graphic ROM data 0, 1, 2, . . . , n are allocated respectively to dot addresses 0, 1, 2, . . . , n for ordinary display, whereas, as shown in FIG. 9B, graphic ROM data n, . . . , 2, 1, 0 are inversely allocated to respective dot addresses 0, 1, 2, . . . , n for inverted display.

In the graphic image display apparatus of FIG. 2, however, since data for a graphic to be displayed and data for an inverted graphic thereof on the graphic ROM 36 are mapped as independent sets of data, the volume of data to be stored in the graphic ROM 36 increases proportionally relative to the desired number of inverted graphics which consequently requires a large circuit. For example, when a graphic for display is inverted left/right to show the original graphic and the inverted graphic, they require the graphic ROM 36 to have a storage capacity twice as large as the capacity necessary for storing the graphic data for the original graphic. In addition, as the storage capacity of the graphic ROM 36 increases, the power consumption of the graphic image display apparatus also increases.

Figure 10:
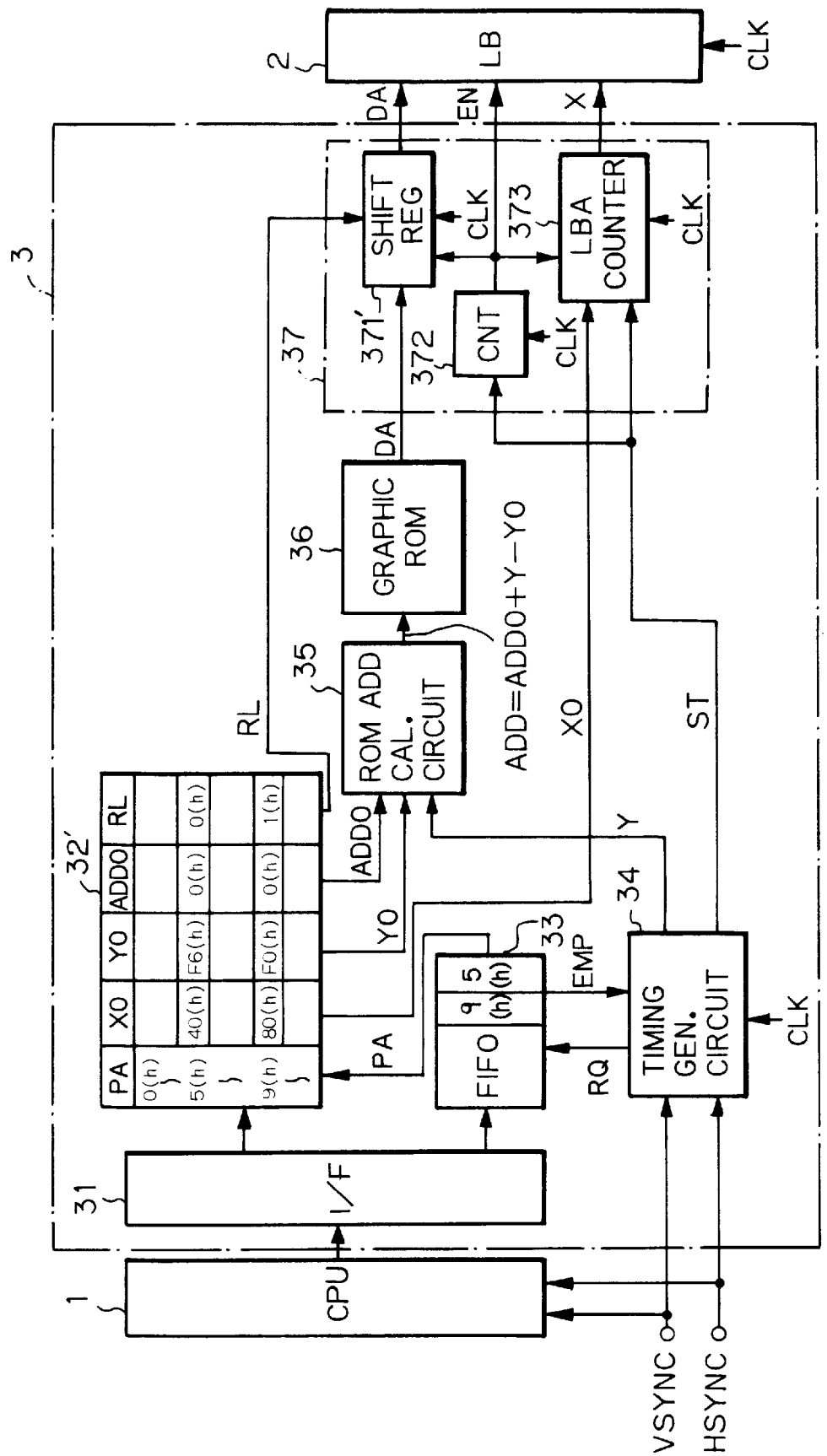
FIG. 10 is a block circuit diagram illustrating a second prior art graphic image display apparatus.
Figure 11:
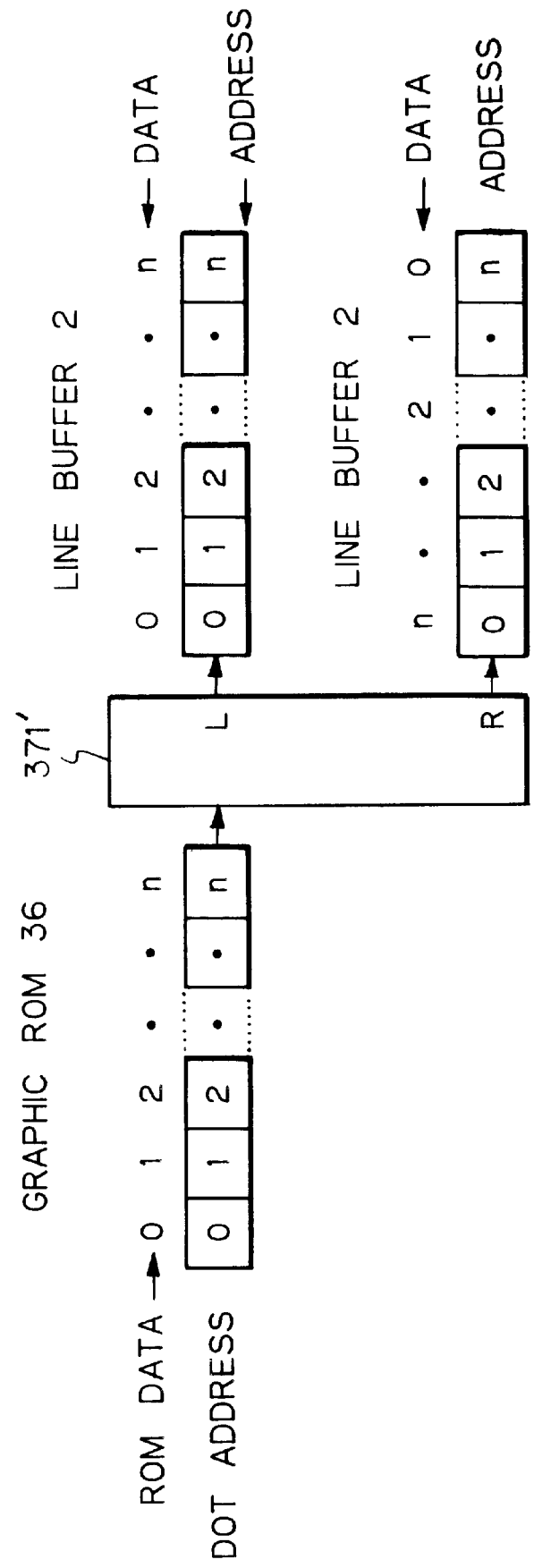
FIG. 11 is a diagram for showing the principle of the operation of the apparatus of FIG. 10.

In FIG. 10, which is a block diagram illustrating a second prior art graphic image display apparatus (see JP-A-62-192793), the parameter RAM 32 of FIG. 2 is modified into a parameter RAM 32' which further stores a bit RL for showing whether a graphic to be displayed is a normal graphic display or a right/left inverted graphic display. Also, the shift register 371 of FIG. 2 is modified into a bidirectional shift register 371' for storing display data in the line buffer 2 in a descending order or in an ascending order. That is, the graphic for display ROM data is temporarily stored in the shift register 371' and then stored in the line buffer 2 in a descending order from upper bits to lower bits or in an ascending order from lower bits to upper bits in order to invert a graphic for display left/right. That is, as shown in FIG. 11, the shift register 371' carries out a leftward shift to output graphic ROM data 0, 1, 2, . . . , n for dot addresses 0, 1, 2, . . . , n for normal display. On the other hand, the shift register 371' carries out a rightward shift to output inverted graphic ROM data n, . . . , 2, 1, 0 for dot addresses 0, 1, 2, . . . , n.

Figure 12:
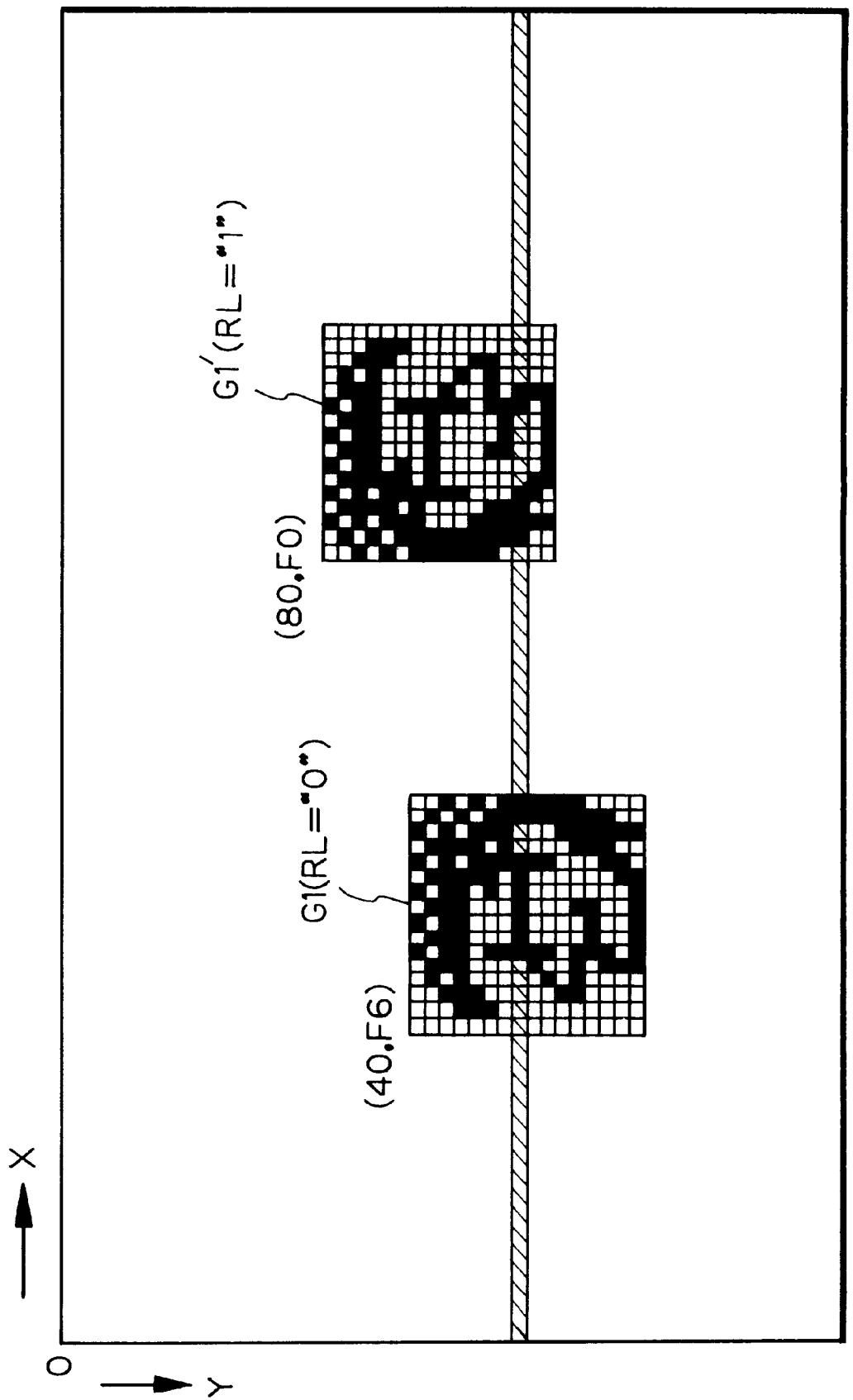
FIG. 12 is an illustration of graphics that can be displayed by the apparatus of FIG. 10.

The parameter RAM 32' also stores graphic data for one frame. For example, as shown in FIG. 12, if the parameter RAM 32' stores a graphic image G1 and a graphic image G1' which is obtained by right/left inverting the graphic image, the parameter RAM 32' stores an origin coordinate (X0, Y0)=(40, F6) for the graphic image G1 designated by a ROM addrers ADD0=0(h) and an origin coordinate (X0, Y0)=(80, F0) for the graphic image G1' designated by a ROM address ADD0=0(h). In this case, the parameter RAM 32' further stores the bit RL (="0") for the graphic image G1 and the bit RL (="1") for the graphic image G1'.

The bit RL generated from the parameter RAM 32' is transmitted to the bidirectional shift register 371'.

In FIG. 13, which shows an example of the content of the graphic ROM 36 of FIG. 10, two graphic images G1 and G3 are stored in advance. In this case, it is unnecessary to store tie graphic image G1' obtained by left/right inverting the graphic image G1, which can reduce the parameter RAM 36 in size.

Figure 14:
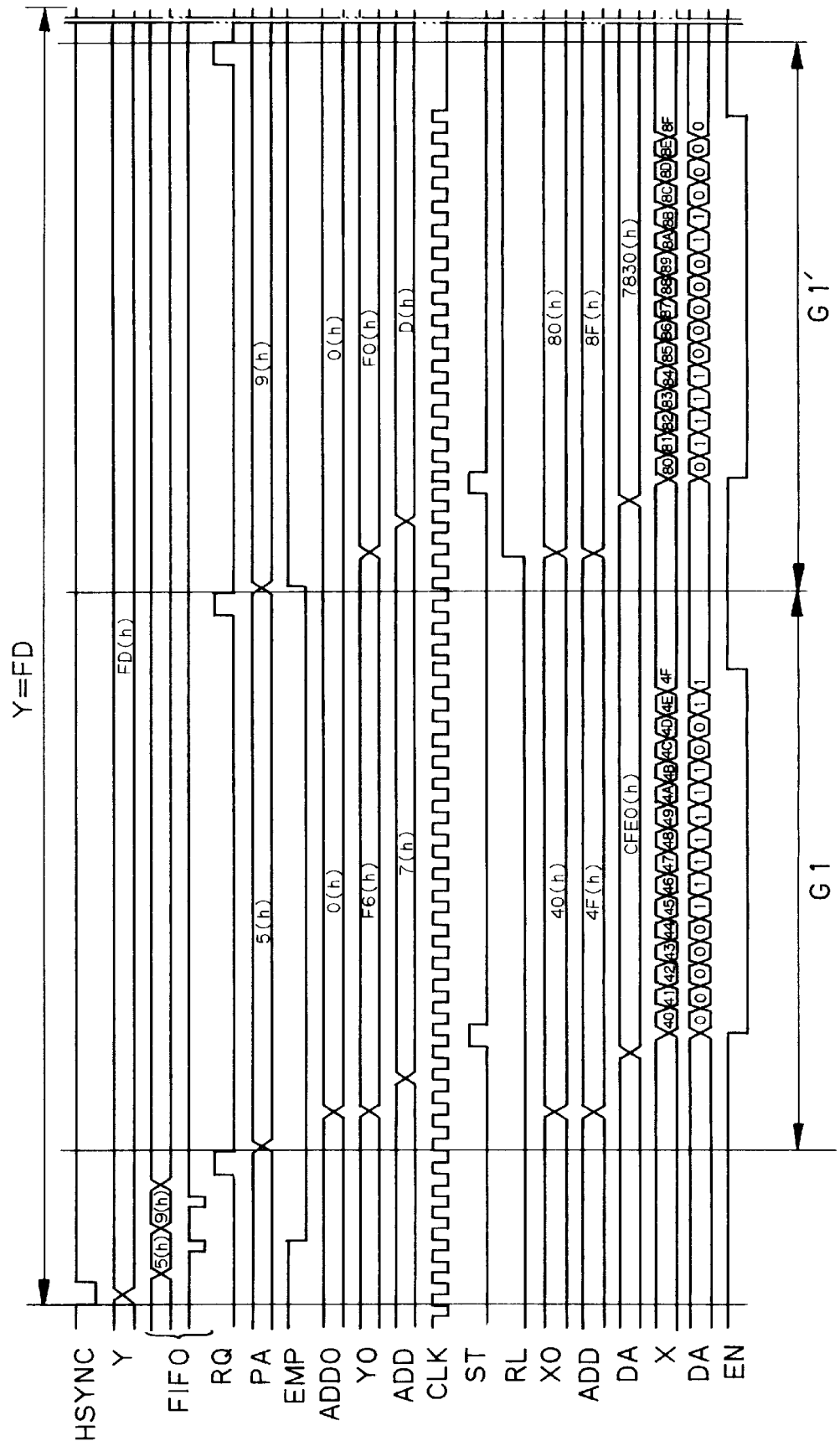
FIG. 14 is a timing diagram for explaining the operation of the apparatus of FIG. 10.

The operation of the apparatus of FIG. 10 is also shown in FIGS. 5, 6 and 7. However, the timing diagram of FIG. 8 is replaced by a timing diagram as shown in FIG. 14.

Note that, at step 503, the CPU 1 also sets a bit RL for each graphic image in the parameter RAM 32'. For example, in order to Obtain an image as shown in FIG. 12, (X0, Y0, ADD0, RL)=(40(h), F6(h), 0(h), 0(h)) for PA=5 (h)

(X0, Y0, ADD0, PL)=(80(h), F0(h), 0(h), 1(h)) for PA=9 (h).

Also, at step 605 of FIG. 6, the timing generating circuit 34 generates an output request signal REQ and transmits it to the FIFO 33. As a result, the FIFO 33 generates a parameter address PA and transmits it to the parameter RAM 32'. For example, as shown in FIG. 14, if the parameter address 5(h) is transmitted to the parameter RAM 32', (X0, Y0, ADD0, RL)=(40(h), F6(h), 0(h); 0(h)) is generated from the parameter RAM 32'. As a result, the ROM address calculating circuit 35 calculates a ROM address ADD by $$ADD=0(h)+FD(h)-F6(h)$$
$$=7(h)$$

Therefore, for graphic image G1 and Y=FD(h) shown in FIG. 12, display data DA=CFE0(h)=(0000011111110011) is transmitted from the graphic ROM 36 to the bidirectional shift register 371'. Similarly, if the parameter address 9(h) is transmitted to the parameter RAM 32, (X0, Y0, ADD0, RL)=(80(h), F0(h), 0(h), 1(h)) is generated from the parameter RAM 32'. As a result, the ROM address calculating circuit 35 calculates a ROM address ADD by $$ADD=F0(h)+FD(h)-0(h)$$
$$=D(h)$$

Therefore, for graphic image G1' and Y=FD(h) shown in FIG. 12, display data DA=7830(h)=(0000110000011110) is transmitted from the graphic ROM 36 to the shift register 371'.

Further, at step 607 of FIG. 6, the timing generating circuit 34 generates a display start signal ST and transmits it to the bidirectional shift register 371', the counter 372 and the line buffer address counter 373. As a result, as shown in FIG. 14, if the X origin coordinate X0 is 40, the dot address X changed by the line buffer address counter 373 is 40, 41, . . . , 4F. In this case, since the bit RL is "0", the birectional shift register 371' outputs the graphic data stored therein in the order of from lower to upper dots (0000011111110011). Thus, the display data DA (0000011111110011) is transmitted to the line buffer 2 in synchronization with the dot address X (40, 41, . . . , 4F). Similarly, if the origin coordinate X0 is 80, the dot address X changed by the line buffer address counter 373 is 80, 81, . . . , 8F. In this case, since the bit RL is "1", the bidirectional shift register 371' outputs the graphic data stored therein in the order of from upper to lower dots (0111100000110000). Thus, the inverted display data DA (0111100000110000) is transmitted to the line buffer 2 in synchronization with the dot address X (80, 81, . . . , 8F).

In the graphic image display apparatus of FIG. 10, however, since use is made of the bidirectional shift register 371', the circuit configuration is complex.

Figure 15:
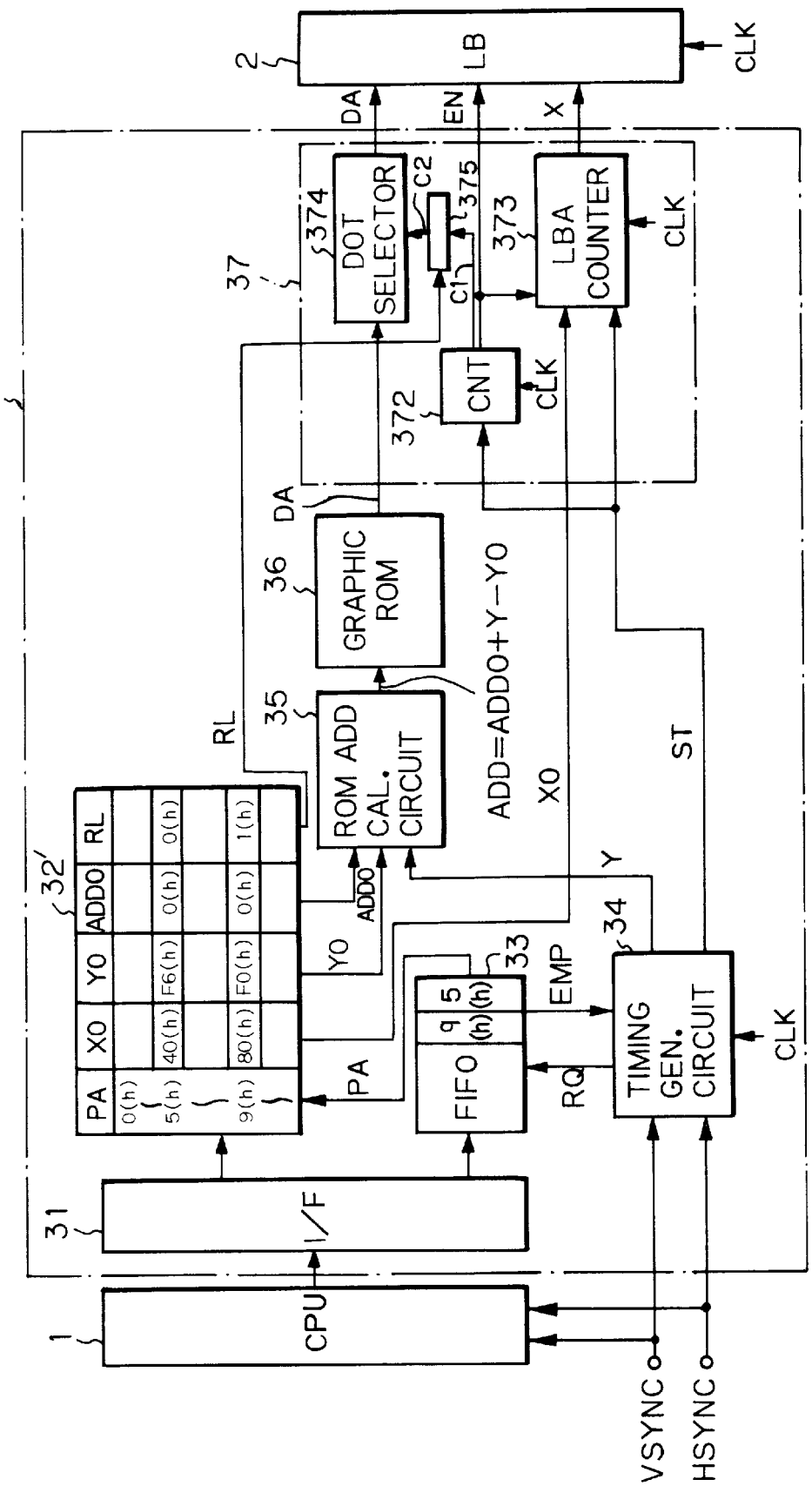
FIG. 15 is a block circuit diagram illustrating a first embodiment of the art graphic image display apparatus according to the present invention.

In FIG. 15, which illustrates a first embodiment of the present invention, the output circuit 37 includes a dot selector 374 and a converter 375 instead of the bidirectional shift register 371' of FIG. 10. The dot selector 374 receives 16-bit outputs from the graphic ROM 36 in parallel, and outputs them serially in an ascending order or in a descending order in accordance with the output of the converter 375. The counter 372 also generates a 4-bit count output C1 which is cleared by the display start signal ST and is counted up by receiving the clock signal CLK. The 4-bit count output C1 is supplied to the converter 375 which, in turn, converts the 4-bit count output C1 into a 4-bit count output C2 in accordance with the bit RL.

Figure 16:
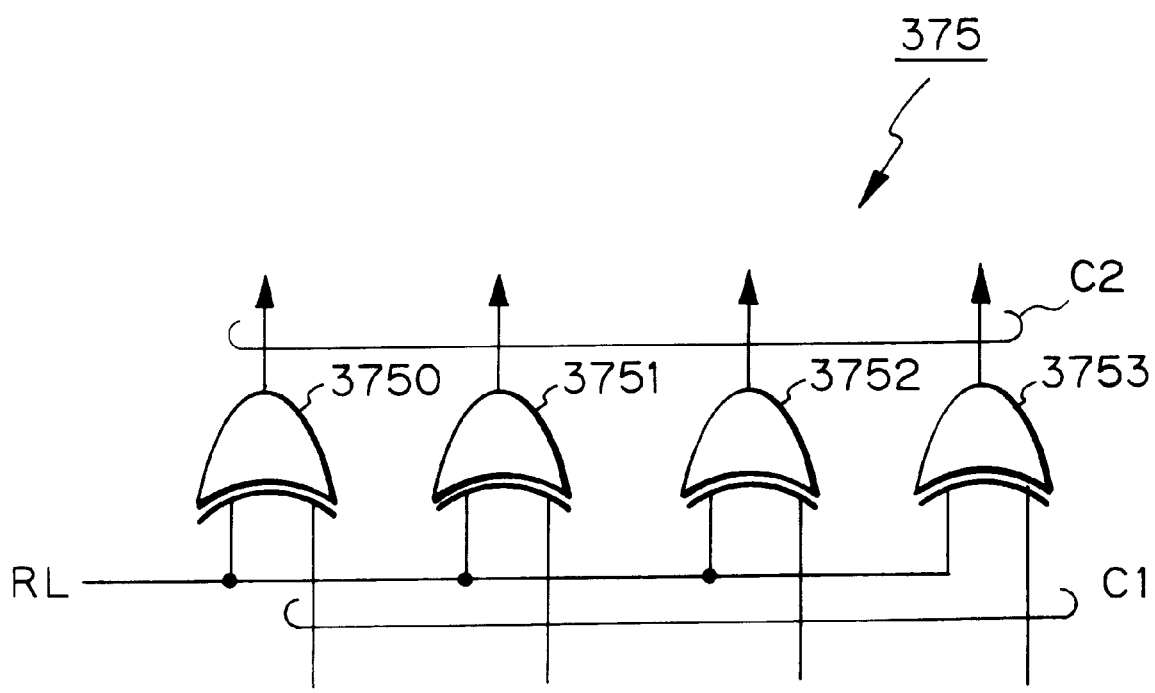
FIG. 16 is a detailed circuit diagram of the converter of FIG. 15.

As illustrated in FIG. 16, the converter 375 is formed by four exclusive OR circuits 3750, 3751, 3752 and 3753 controlled by the bit RL. For example, if RL="0", C2=C1. That is, when the 4-bit count output C1 is 0, 1, . . . , F(h), the 4-bit count output C2 is also 0, 1, . . . , F(h). Contrary to this, if RL="1", C2 is an inverted value of C1. That is, when the 4-bit count output C1 is 0, 1, . . . , F(h), the 4-bit count output C2 is F, E, . . . , 0(h).

Figure 17:
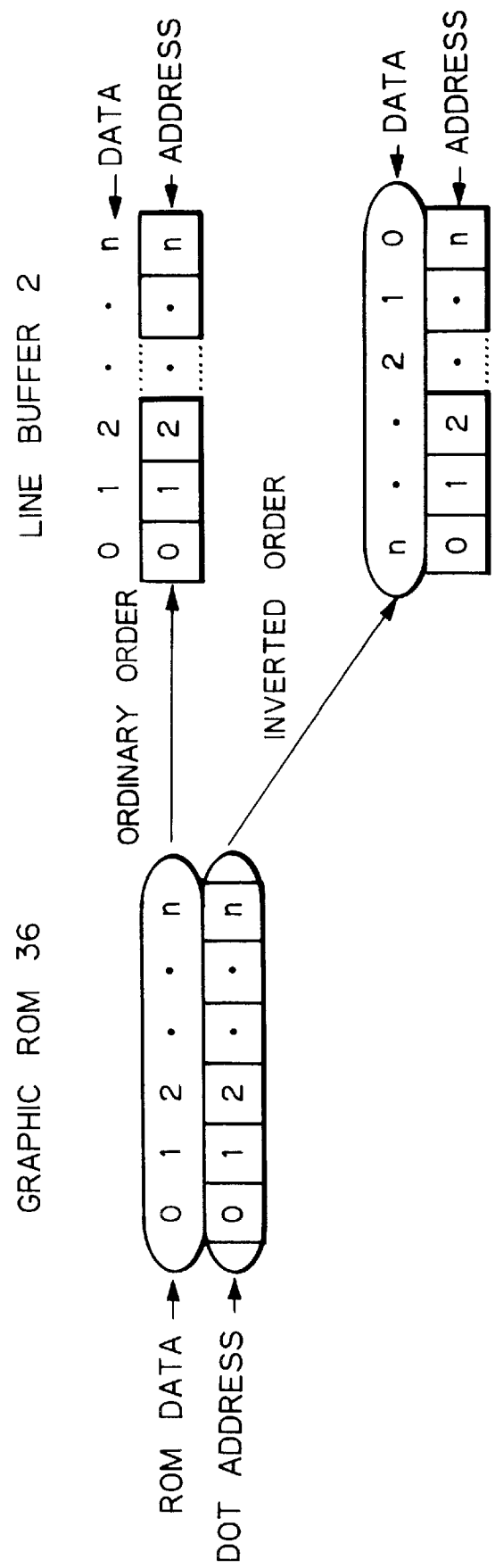
FIG. 17 is a diagram for showing the principle of the operation of the apparatus of FIG. 15.

The algorithm of the apparatus of FIG. 15 is shown in FIG. 17. That is, dot addresses of the graphic for display to be stored in the line buffer 2 are rearranged into an ordinary dot order to alter the order of storing data so that the original graphic may be displayed in an ordinary dot order or in an inverted dot order be displayed in terms of horizontal direction. That is, the dot selector 374 outputs ROM data 0, 1, 2, . . . , n corresponding to dot addresses 0, 1, 2, . . . , n without alteration for normal display. On the other hand, the dot selector 374 inversely outputs graphic ROM data n, . . . , 2, 1, 0 in corrodepcidance to dot,addresses 0, 1, 2, . . . , n as a result of selecting desired dots.

Figure 18:
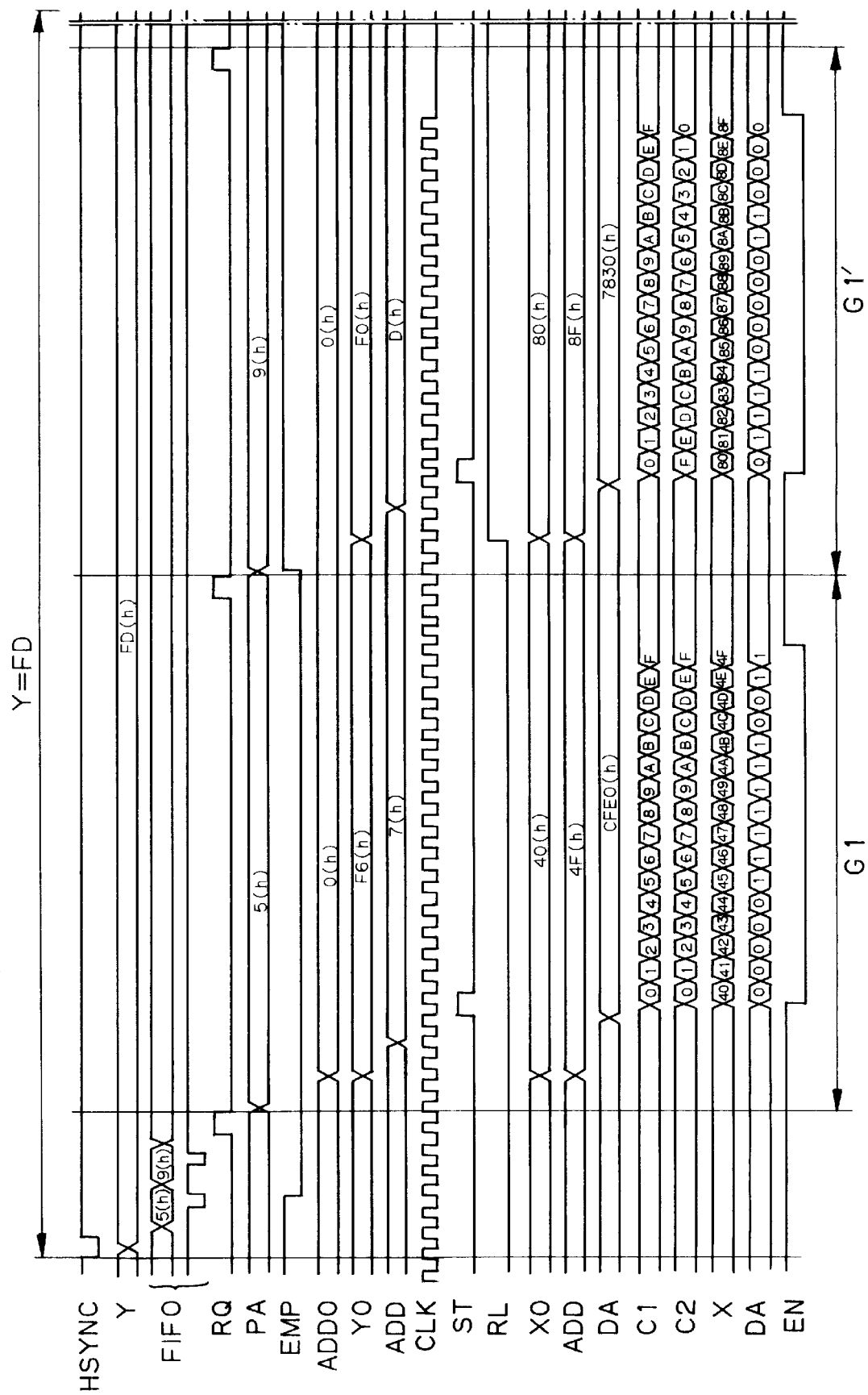
FIG. 18 is a timing diagram for explaining the operation of the apparatus of FIG. 15.

The operation of the apparatus of FIG. 15 is essentially the same as that of the apparatus of FIG. 10. That is, the operation of the apparatus of FIG. 15 is also shown in FIGS. 5, 6 and 7. However, the timing diagram of FIG. 14 is replaced by a timing diagram as shown in FIG. 18.

Note that, at step 607 of FIG. 6, the timing generating circuit 34 generates a display start signal ST and transmits it to the counter 372 and the line buffer address counter 373. As a result, as shown in FIG. 18, if the X origin,coordinate X0 is 40, the dot address X changed by the line buffer address counter 373 is 40, 41, . . . , 4F. In this case, since the bit RL is "0", the output C2 of the converter 375 is the same as the output C1 of the counter 372, so that the output C2 is 0, 1, . . . , F(h). Therefore, for the graphic image G1 and Y=FD(h) shown in FIG. 12, the dot selector 374 outputs the graphic data stored therein in the order of from lower to upper dots (0000011111110011). Thus, the display data DA (0000011111110011) is transmitted to the line buffer 2 in synchronization with the dot address X (40, 41, . . . , 4F). Similarly, if the origin coordinate X0 is 80, the dot address X changed by the line buffer address counter 373 is 80, 81, . . . , 8E. In this case, since the bit RL is "1", the output C2 of the converter 375 is opposite to the output C1 of the counter 372, so that the output C2 is F, G, . . . , 0(h). Therefore, for the graphic image G1' and Y=FD(h) shown in FIG. 12, the dot selector 374 outputs the graphic data stored therein in the order of from upper to lower dots (0111100000110000). Thus, the inverted display data DA (0111100000110000) is transmitted to the line buffer 2 in synchronization with the dot address X (80, 81, . . . , 8F).

Figure 19:
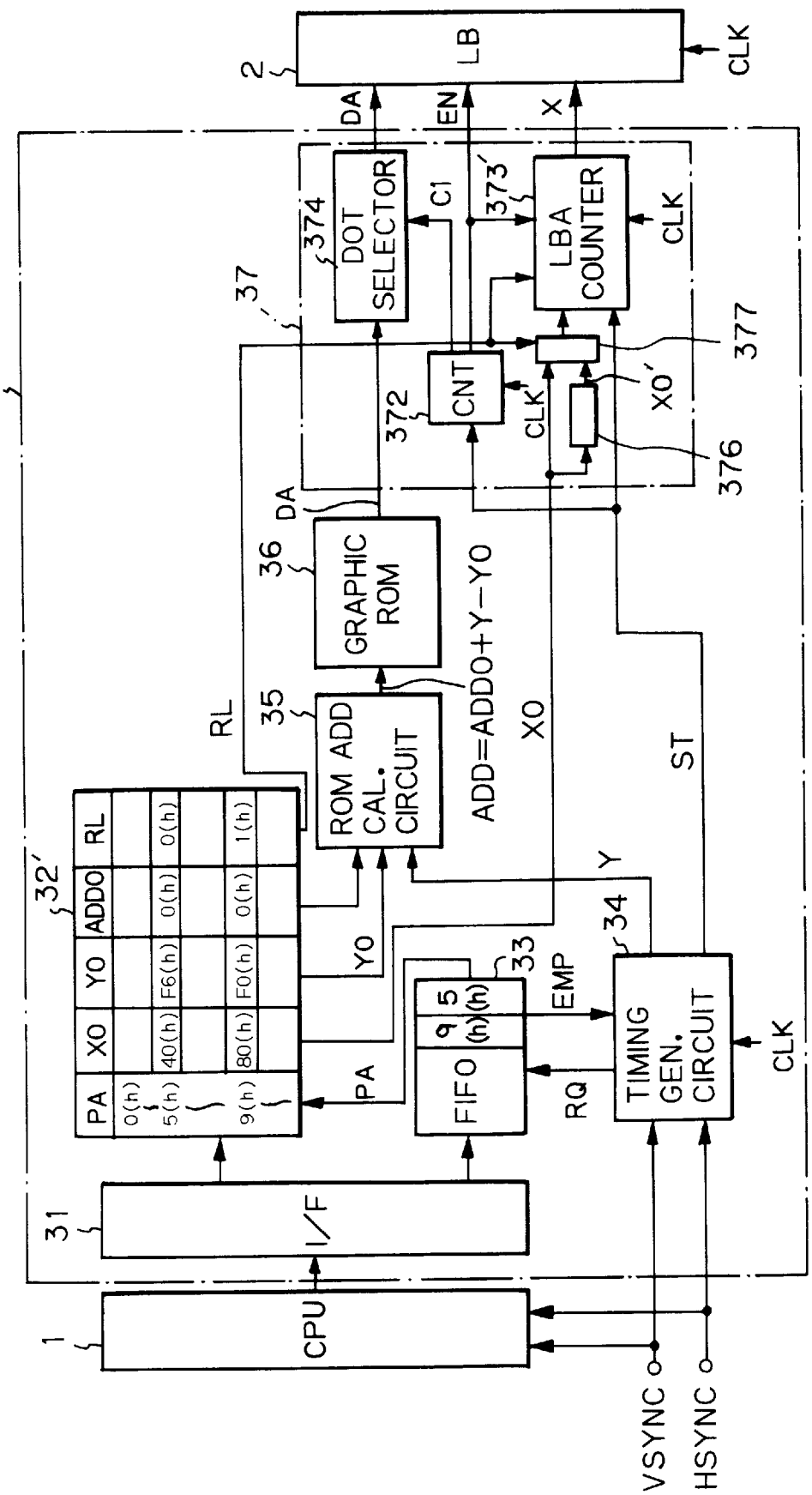
FIG. 19 is a block circuit diagram illustrating a second embodiment of the art graphic image display apparatus according to the present invention.

In FIG. 19, which illustrates a second embodiment of the present invention, the output circuit 37 includes a converter 376 and a selector 377 instead of the converter 375 of FIG. 15. That is, the count output C1 of the counter 372 is supplied without modification to the dot selector 374, so that the dot selector 374 receives 16-bit outputs from the graphic ROM 36 in parallel, and outputs them serially in an ascending order in accordance with the count output C1 of the counter 372.

Also, the converter 376 converts the X origin coordinate X0 into an X origin coordinate X0' showing a right end represented by $$X0'=X0+F(h)$$

Figure 20:
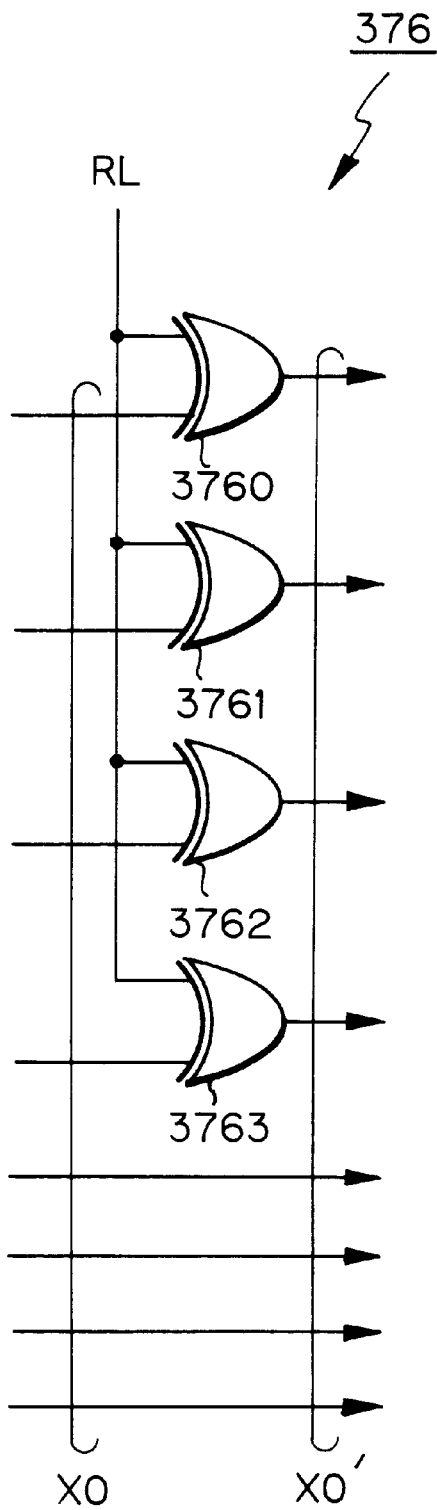
FIG. 20 is a detailed circuit diagram of the converter of FIG. 19.

As illustrated in FIG. 20, the converter 376 is formed by four exclusive OR circuits 3760, 3761, 3762 and 3763 controlled by the bit RL. That is, only the four lower bits of the X origin coordinate X0 are supplied to the exclusive OR circuits 3760, 3761, 3762 and 3763. For example, if RL="0", X0=X0. That is, when X0 is 80, 81, . . . , 8F(h), X0' is also 80, 81, . . . , 8F(h). Contrary to this, if RL="1", the four lower bits of X0 are inverted to form X0'. That is, when X0 is 80, 81, . . . , 8F(h), X0' is 8F, 8G, . . . , 80(h).

Also, in FIG. 19, the line buffer address counter 373 of FIG. 15 is modified into an up/down type line buffer address counter 373' which is controlled by the bit RL. That is, if RL="0", the line buffer address counter 373' is an up counter, while, if RL="1", the line buffer 373' is a down counter.

Figure 21:
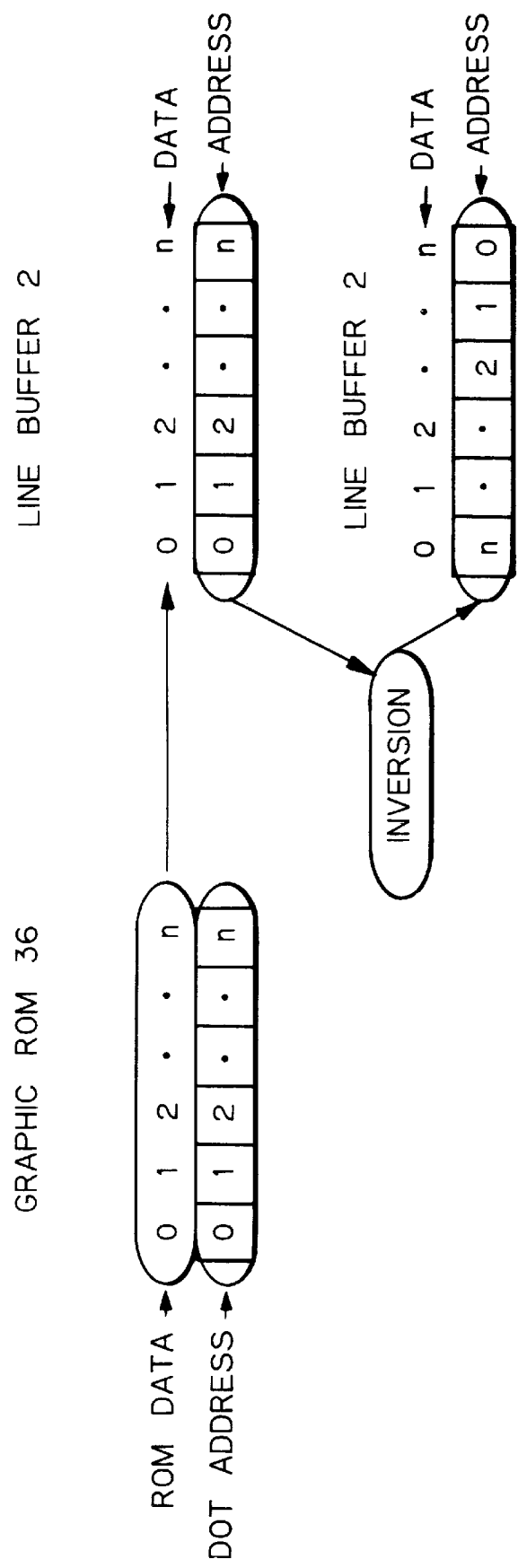
FIG. 21 is a diagram for showing the principle of the operation of the apparatus of FIG. 19.

The algorithm of the apparatus of FIG. 19 is shown in FIG. 21. That is, the mode of supplying addresses to the line buffer 2 is inverted to alter the data storing order to make it conform to an inverse dot order to consequently display a graphic produced by realizing a horizontal inverse dot order for the original graphic.

Figure 22:
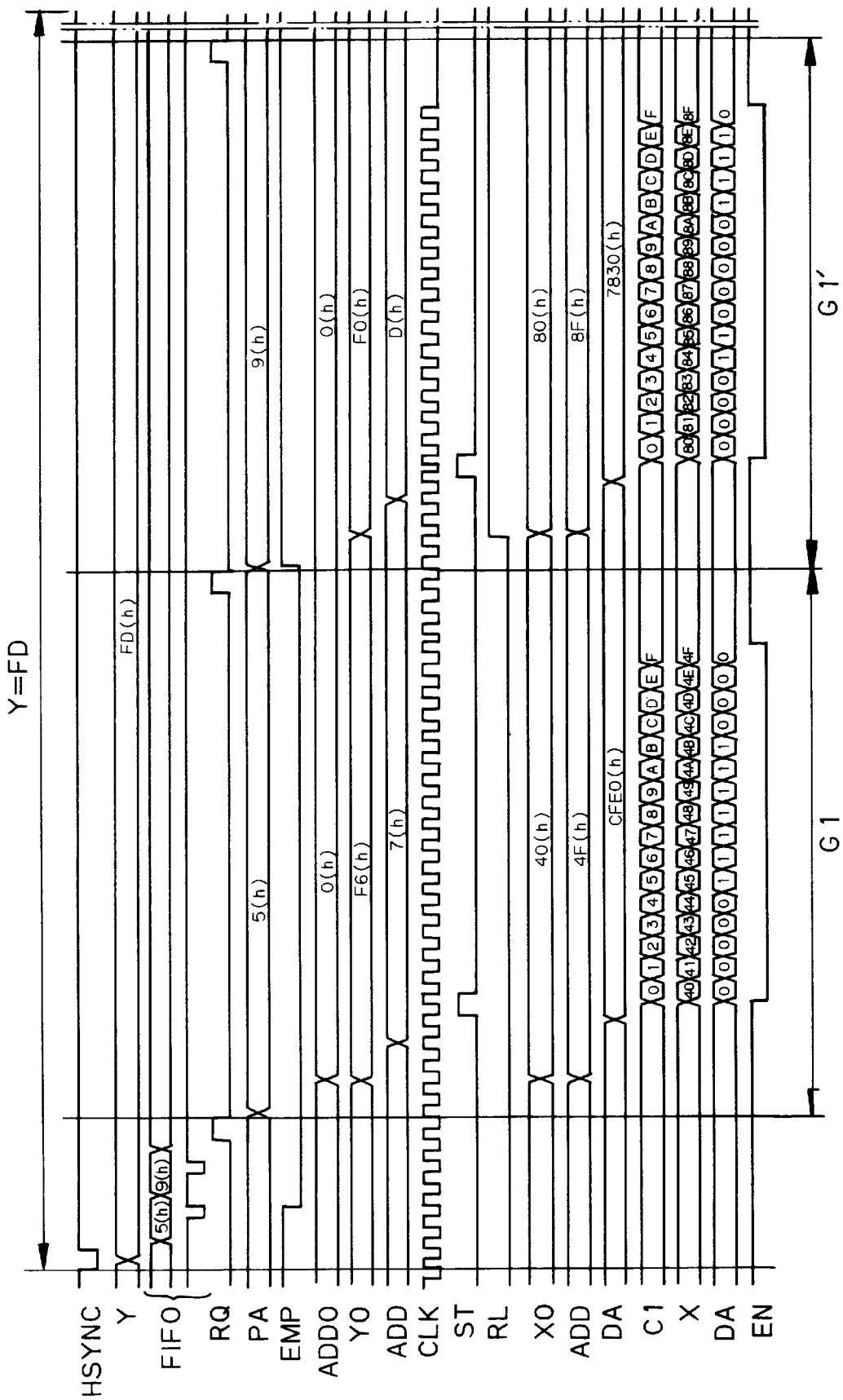
FIG. 22 is a timing diagram for explaining the operation of the apparatus of FIG. 19.

The operation of the apparatus of FIG. 19 is about the same as that of the apparatus of FIG. 10. That is, the operation of the apparatus of FIG. 19 is also shown in FIGS. 5, 6 and 7. However, the timing diagram of FIG. 14 is replaced by a timing diagram as shown in FIG. 22.

Note that, at step 607 of FIG. 6, the timing generating circuit 34 generates a display start signal ST and transmits it to the counter 372 and the line buffer address counter 373. As a result, as shown in FIG. 22, if the X origin coordinate X0 is 40, since RL="0", the selector 377 selects X0 and the line buffer address counter 373' is an up counter. Therefore, the dot address X changed by the line buffer address counter 373' is 40, 41, . . . , 4F. In this case, for the graphic image G1 and Y=FD(h) shown in FIG. 12, the dot selector 374 outputs the graphic data stored therein in the order of from lower to upper dots (0000011111110011). Thus, the display data DA (0000011111110011) is transmitted to the line buffer 2 in synchronization with the dot address X (40, 41, . . . , 4F). Similarly, if the origin coordinate X0 is 80, since RL="1", the selector 377 selects X0' and the line buffer address counter 373' is a down counter. Therefore, the dot address X changed by the line buffer address counter 373' is 8F, 8G, . . . , 80. In this case, for the graphic image G1' and Y=FD(h) shown in FIG. 12, the dot selector 374 also outputs the graphic data stored therein in the order of from lower to upper dots (0000110000011110). Thus, the display data DA (0000110000011110) is transmitted to the line buffer 2 in synchronization with the dot address X (8F, 8G, . . . , 80).

Figure 23:
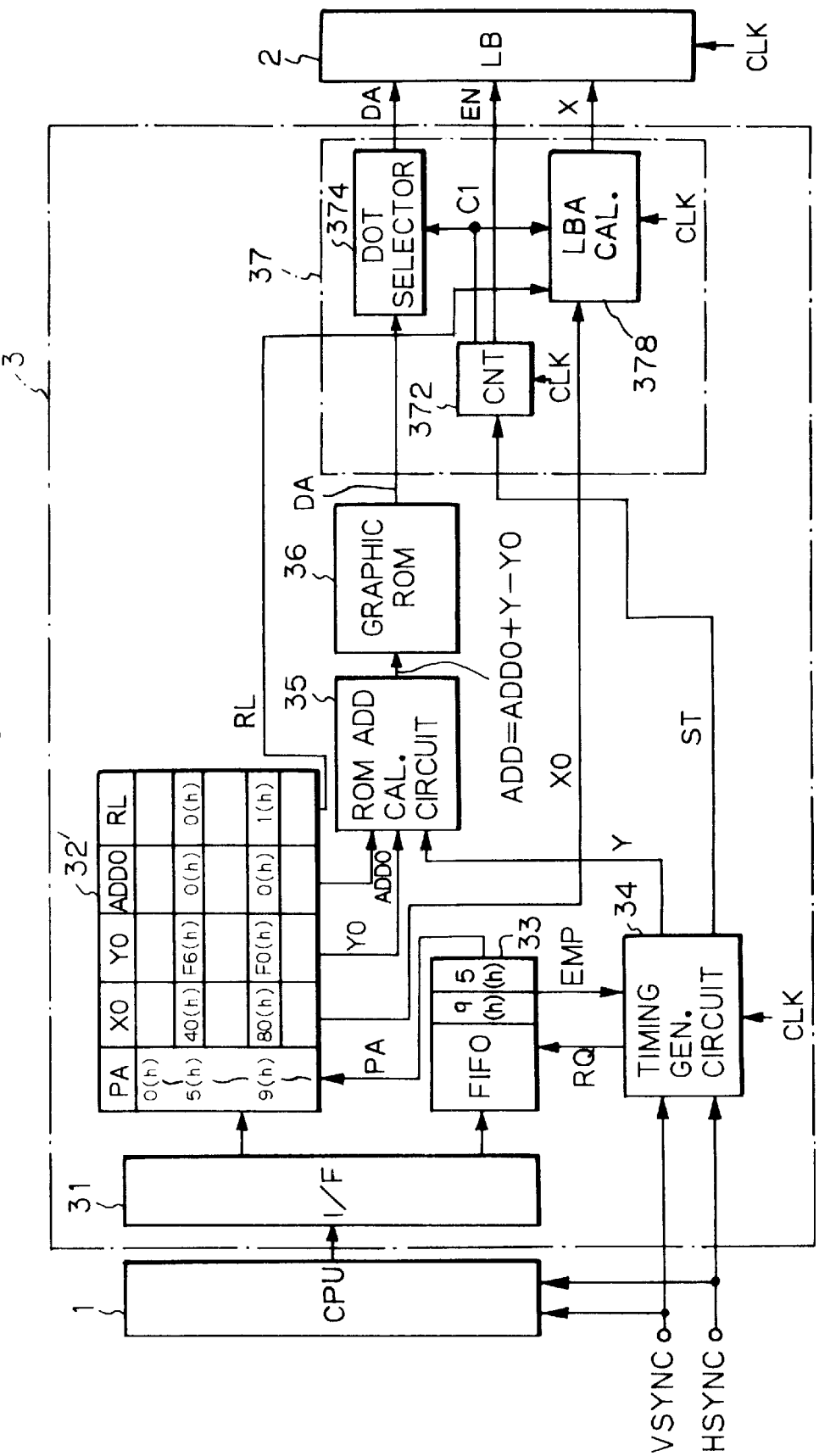
FIG. 23 is a block circuit diagram illustrating a third embodiment of the art graphic image display apparatus according to the present invention.

In FIG. 23, which illustrates a third embodiment of the present invention, the output circuit 37 includes a line buffer address calculating circuit 378 instead of the converter 376, the selector 377 and the line buffer address counter 373' of FIG. 19.

Figure 24:
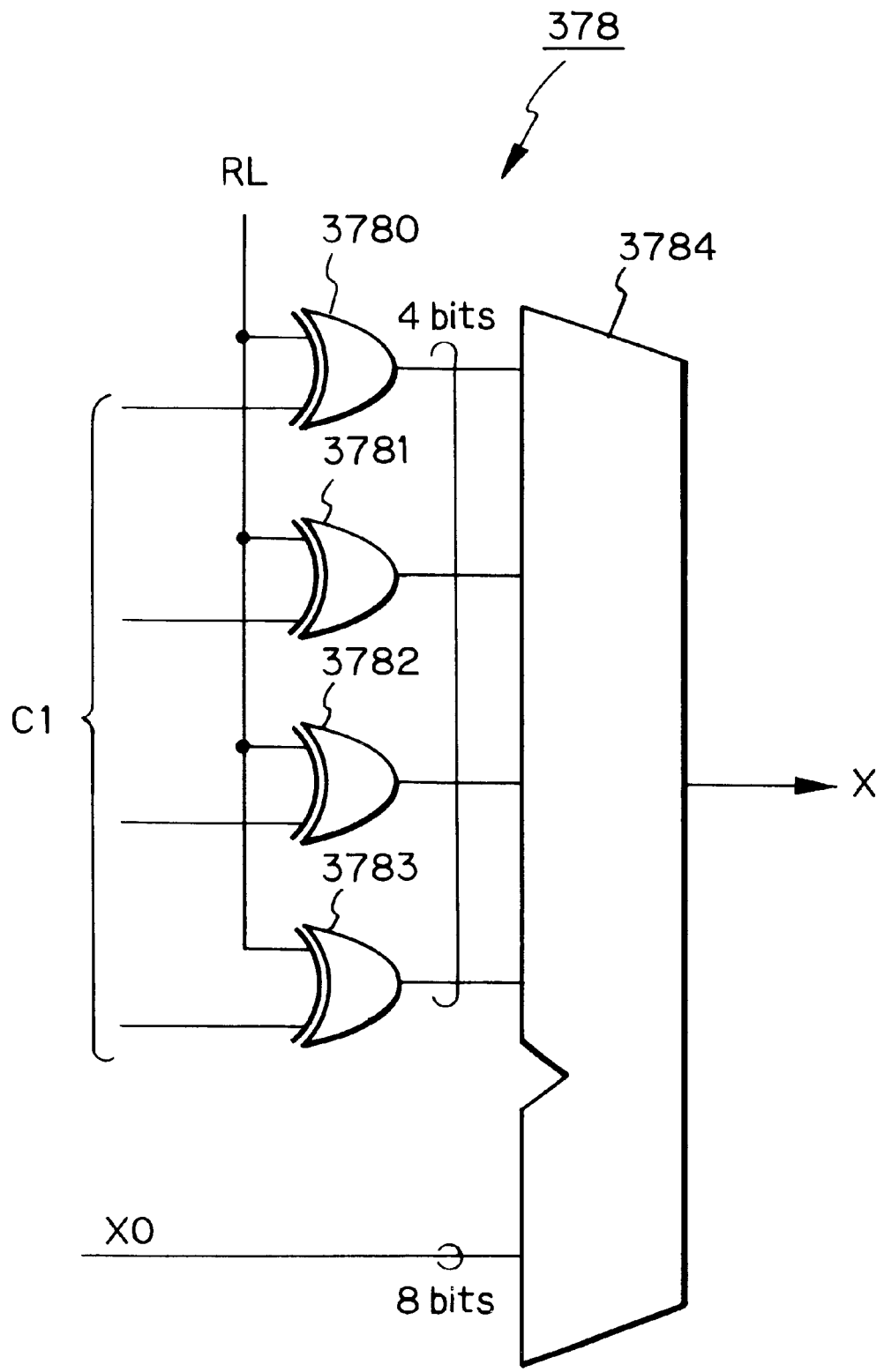
FIG. 24 is a detailed circuit diagram of the line buffer address converter of FIG. 23.

As illustrated in FIG. 24, the line buffer address calculating circuit 378 is formed by four exclusive OR circuits 3780, 3781, 3782 and 3783 controlled by the bit RL, and an adder 3784 for adding the 4-bit output of the exclusive OR circuits 3780, 3781, 3782 and 3783 to the 4 lower bits of the X origin coordinate X0. That is, if RL="0", the 4-bit output C1 of the counter 372 is supplied without modification to the adder 3784, while, if RL="1", the 4-bit output C1 of the counter 372 is inverted and then supplied to the adder 3784. Note that the 4-bit output C1 of the counter 372 is counted up after the generation of the display start signal ST:

C1=0→1→ . . . →F(h)

Therefore, if RL="0", the line buffer address X is changed by X0→X0+1,→X0+2→ . . . →X0+F(h). On the other hand, if RL="1", the line buffer address X is changed by X0+F (h)→X0+E(h)→X0+D(h)→ . . . →X0.

The algorithm of the apparatus of FIG. 23 is also shown in FIG. 21. That is, the mode of supplying addresses to the line buffer 2 is inverted to alter the data storing order to make it conform to an inverse dot order to consequently display a graphic produced by realizing a horizontal inverse dot order for the original graphic.

Figure 25:
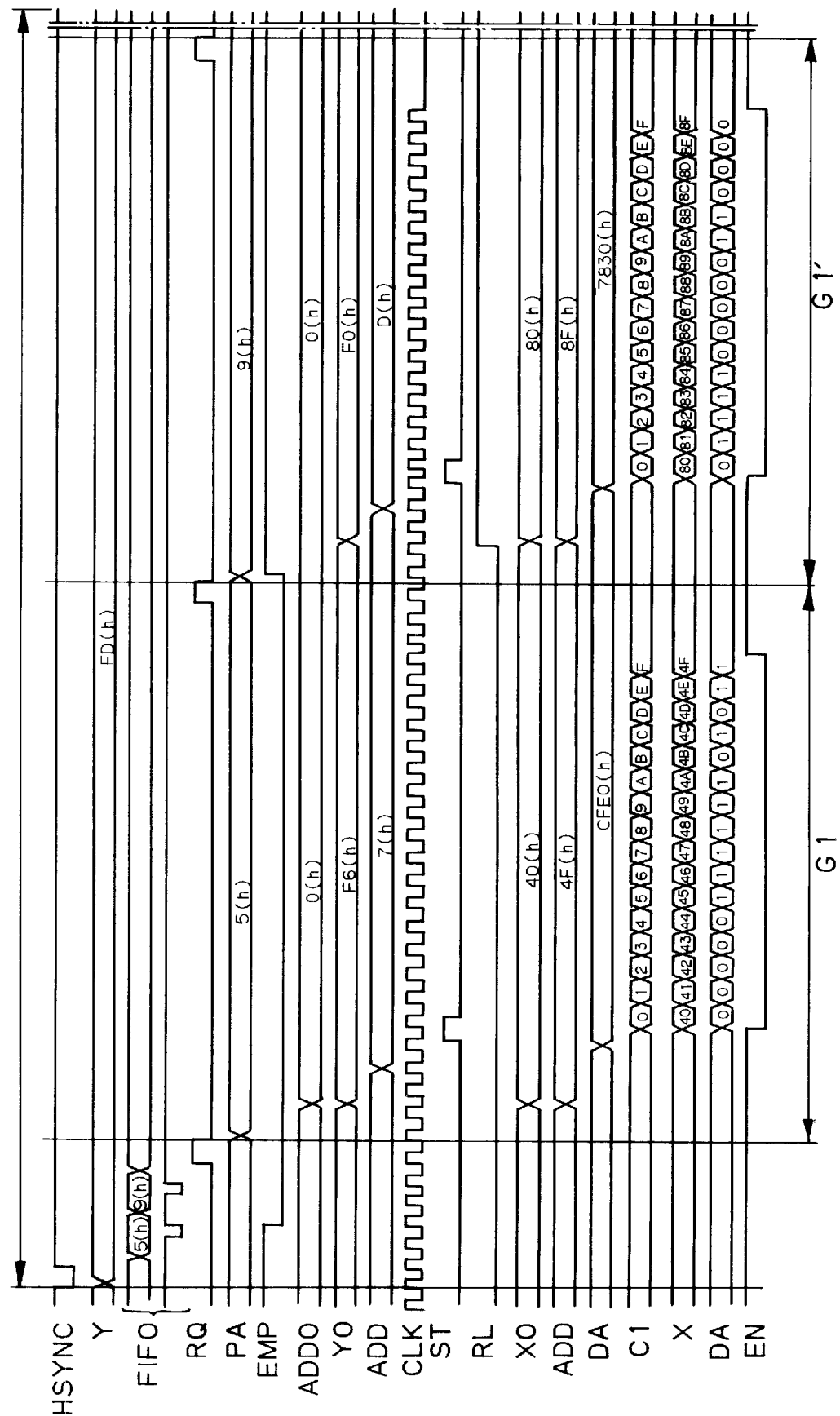
FIG. 25 is a timing diagram for explaining the operation of the apparatus of FIG. 23.

The operation of the apparatus of FIG. 23 is about the same as that of the apparatus of FIG. 19. That is, the operation of the apparatus of FIG. 23 is also shown in FIGS. 5, 6 and 7. However, the timing diagram of FIG. 22 is replaced by a timing diagram as shown in FIG. 25.

Note that, at step 607 of FIG. 6, the timing generating circuit 34 generates a display start signal ST and transmits it to the counter 372. As a result, as shown in FIG. 25, if the X origin coordinate X0 is 40, since RL="0", the outputs of the exclusive OR circuits 3780, 3781, 3782 and 3783 are the sane as the output C1 of the counter 372, and therefore are changed from 0 via 1, 2, . . . , E(h) to F(h). Therefore, the line buffer (dot) address X changed by the adder 3784 is 40, 41, . . . , 4F. In this case, for graphic image G1 and Y=FD(h) shown in FIG. 12, the dot selector 374 outputs the graphic data stored therein in the order of from lower to upper dots (0000011111110011). Thus, the display data DA (0000011111110011) is transmitted to the line buffer 2 in synchronization with the dot address x (40, 41, . . . , 4F). Similarly, if the X origin coordinate X0 is 80, since RL="1", the outputs of the exclusive OR circuits 3780, 3781, 3782 and 3783 are obtained by inverting the output C1 of the counter 372, and therefore are changed from F(h) via E(h), D(h), . . . to 0. Therefore, the line buffer (dot) address X changed by the adder 3784 is 8F, 8G, . . . , 80. In this case, the graphic image G1' and Y=FD(h) shown in FIG. 12, the dot selector 374 also outputs the graphic data stored therein in the order of from lower to upper dots (0000110000011110). Thus, the display data DA (0000110000011110) is transmitted to the line buffer 2 in synchronization with the dot address X (8P, 8G, . . . , 80).

Figure 26:
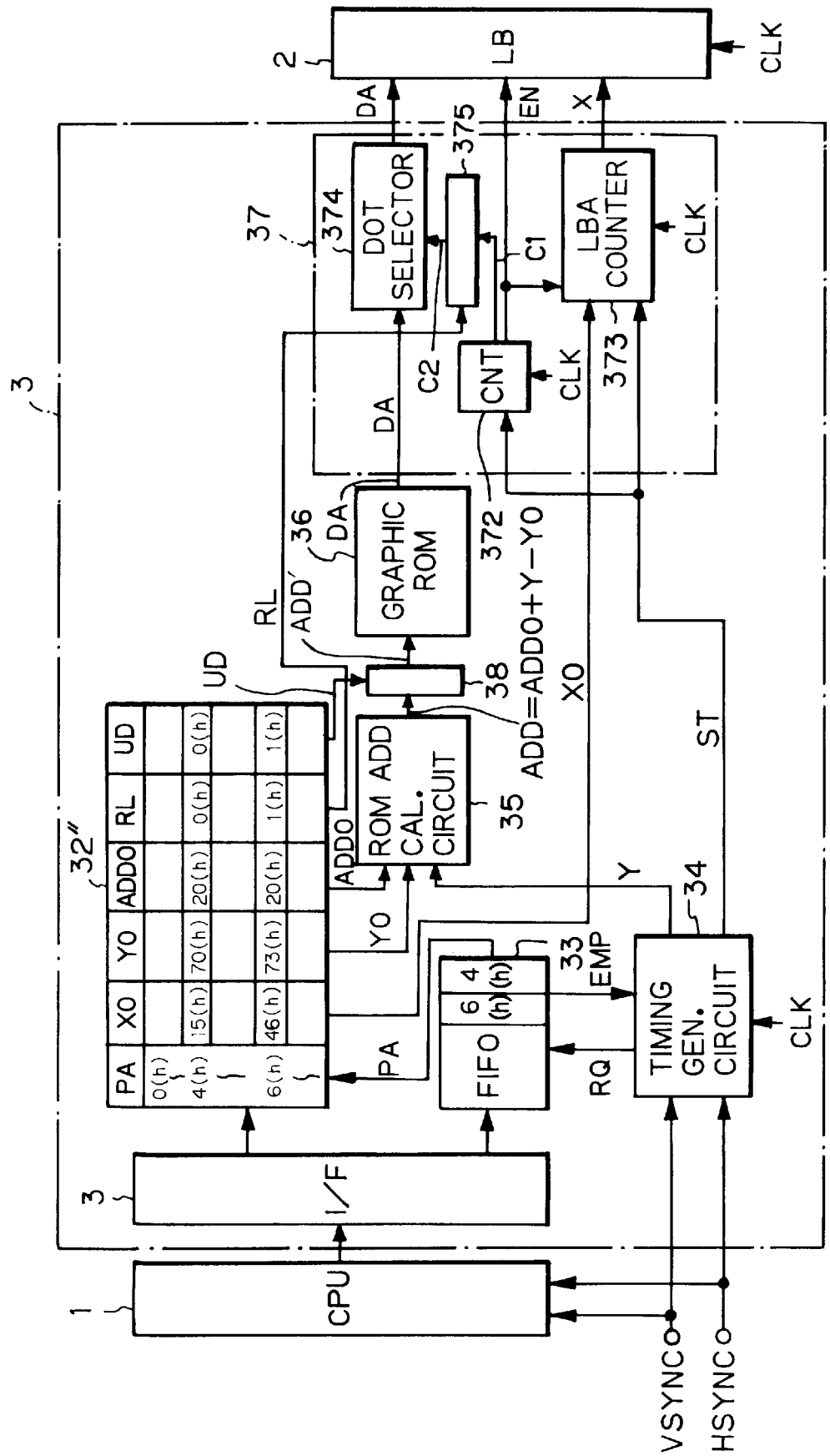
FIG. 26 is a block circuit diagram illustrating a fourth embodiment of the art graphic image display apparatus according to the present invention.

In FIG. 26, which illustrates a fourth embodiment of the present invention, the parameter RAM 32' of FIG. 15 is modified into a parameter RAM 32" which further stores a bit UD for showing whether a graphic to be displayed is a normal graphic display or an up/down inverted graphic display. Also, a converter 38 for up/down inverting a graphic image is inserted between the ROM address calculating circuit 35 and the graphic ROM 36 of FIG. 15.

Figure 27:
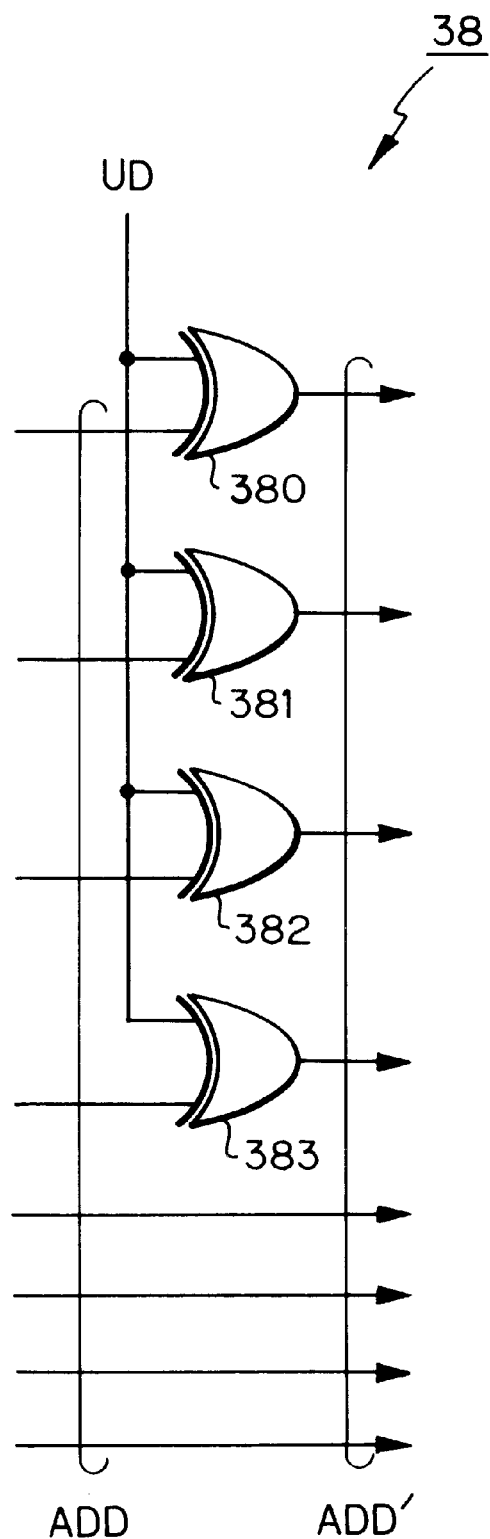
FIG. 27 is a detailed circuit diagram of the converter of FIG. 26.

As illustrated in FIG. 27, the converter 386 is formed by four exclusive OR circuits 380, 381, 382 and 383 controlled by the bit UD. That is, only the four lower bits of the scan line address are supplied to the exclusive OR circuits 380, 381, 382 and 383. For example, if UD="0", ADD'=ADD. Contrary to this, if UD="1", the four lower bits of ADD are inverted to form ADD'.

Figure 28:
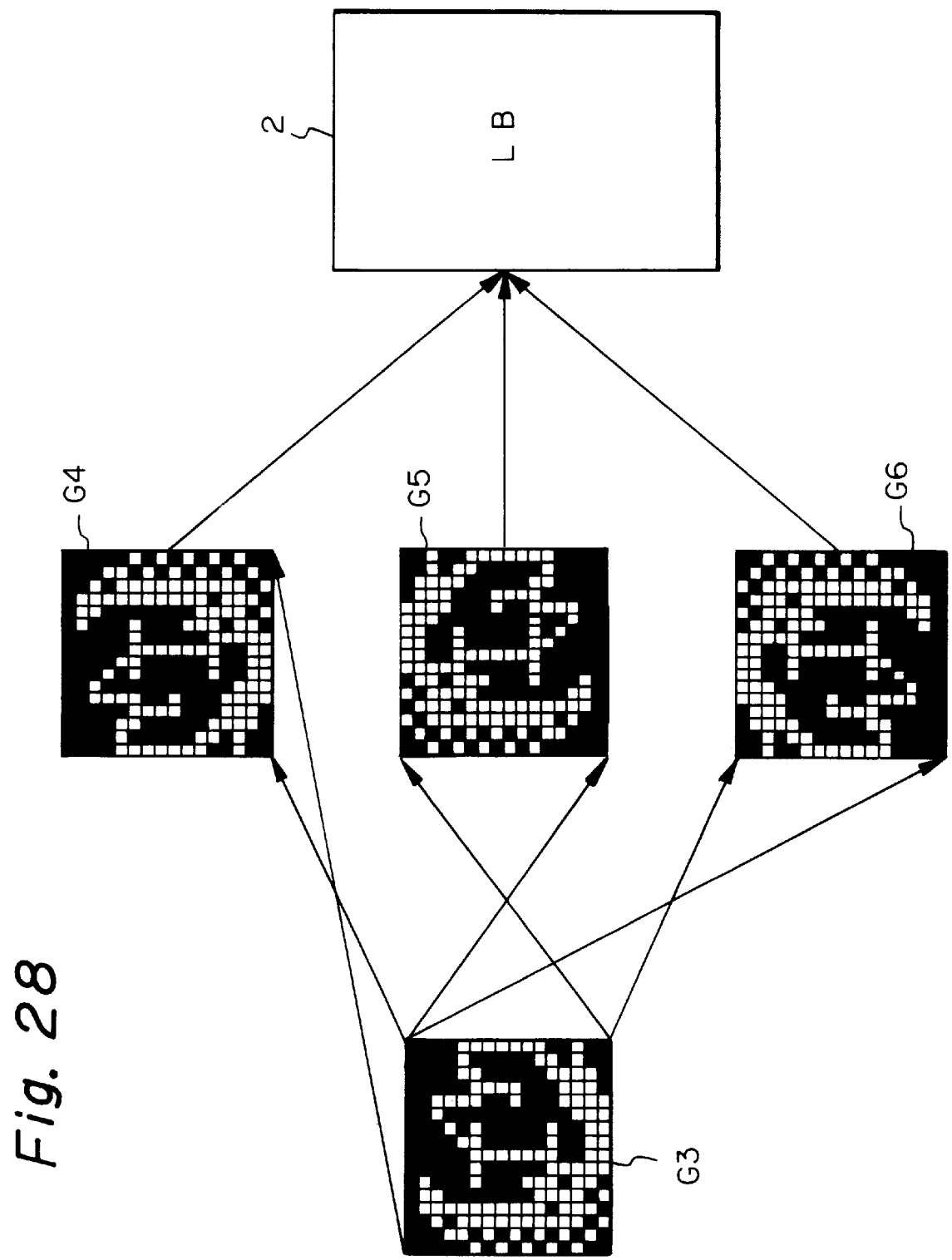
FIG. 28 is a diagram for showing the principle of the operation of the apparatus of FIG. 26.

The algorithm of the apparatus of FIG. 26 is shown in FIG. 28. That is, dot addresses of the graphic for display to be stored in the line buffer 2 are rearranged into an ordinary dot order to alter the order of storing data so that the original graphic may be displayed in an ordinary dot order, in an inverted dot order to be displayed in terms of horizontal direction (G3→G4), in an inverted order to be displayed in terms of vertical direction (G3→G5), or in an inverted order to be displayed in terms of both horizontal and vertical directions (G3→G5).

Figure 30:
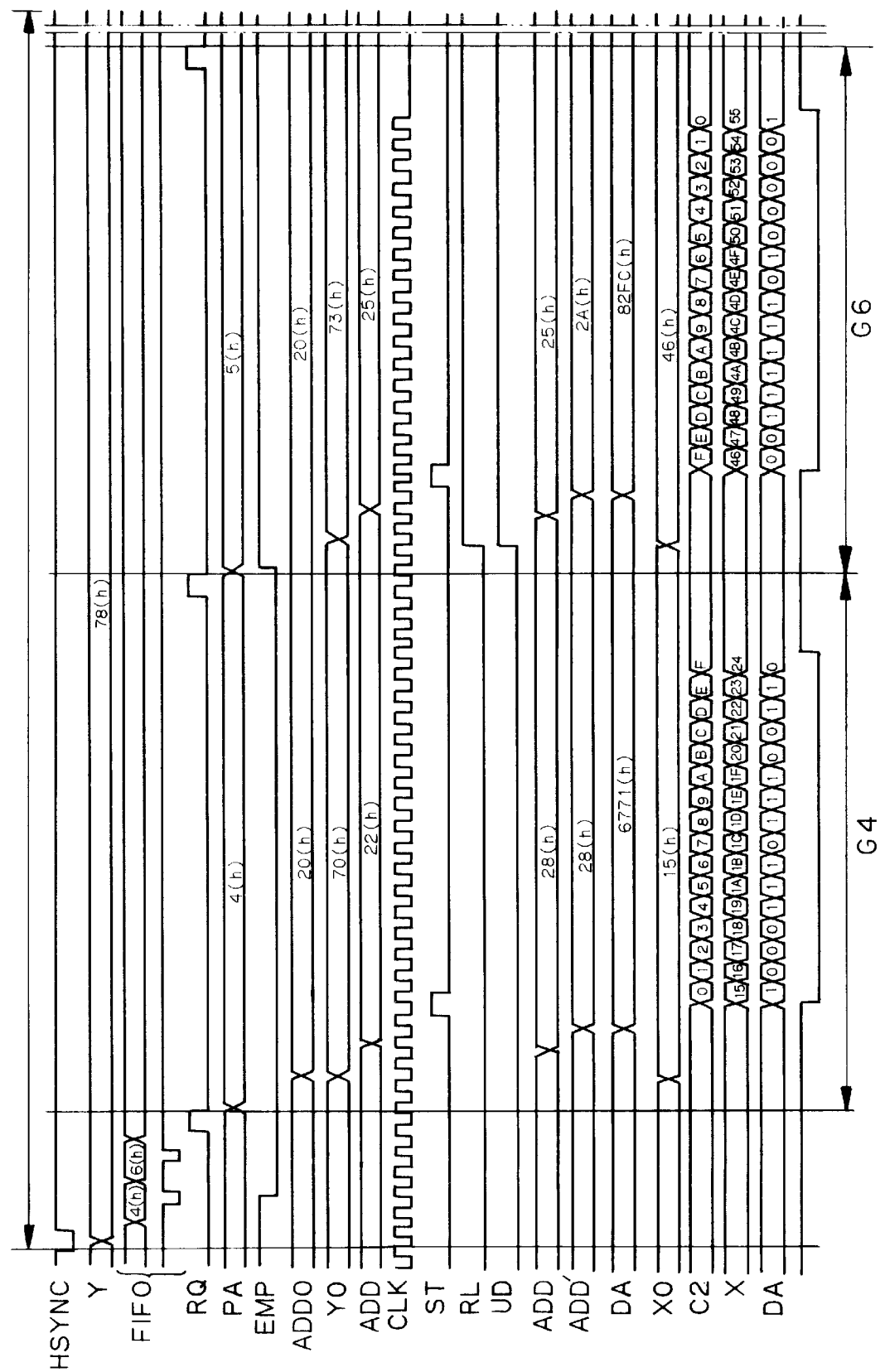
FIG. 30 is a timing diagram for explaining the operation of the apparatus of FIG. 26.

The operation of the apparatus of FIG. 26 is essentially the same as that of the apparatus of FIG. 15. That is, the operation of the apparatus of FIG. 26 is also shown in FIGS. 5, 6 and 7. However, the timing diagram of FIG. 18 is replaced by a timing diagram as shown in FIG. 30.

Figure 29:
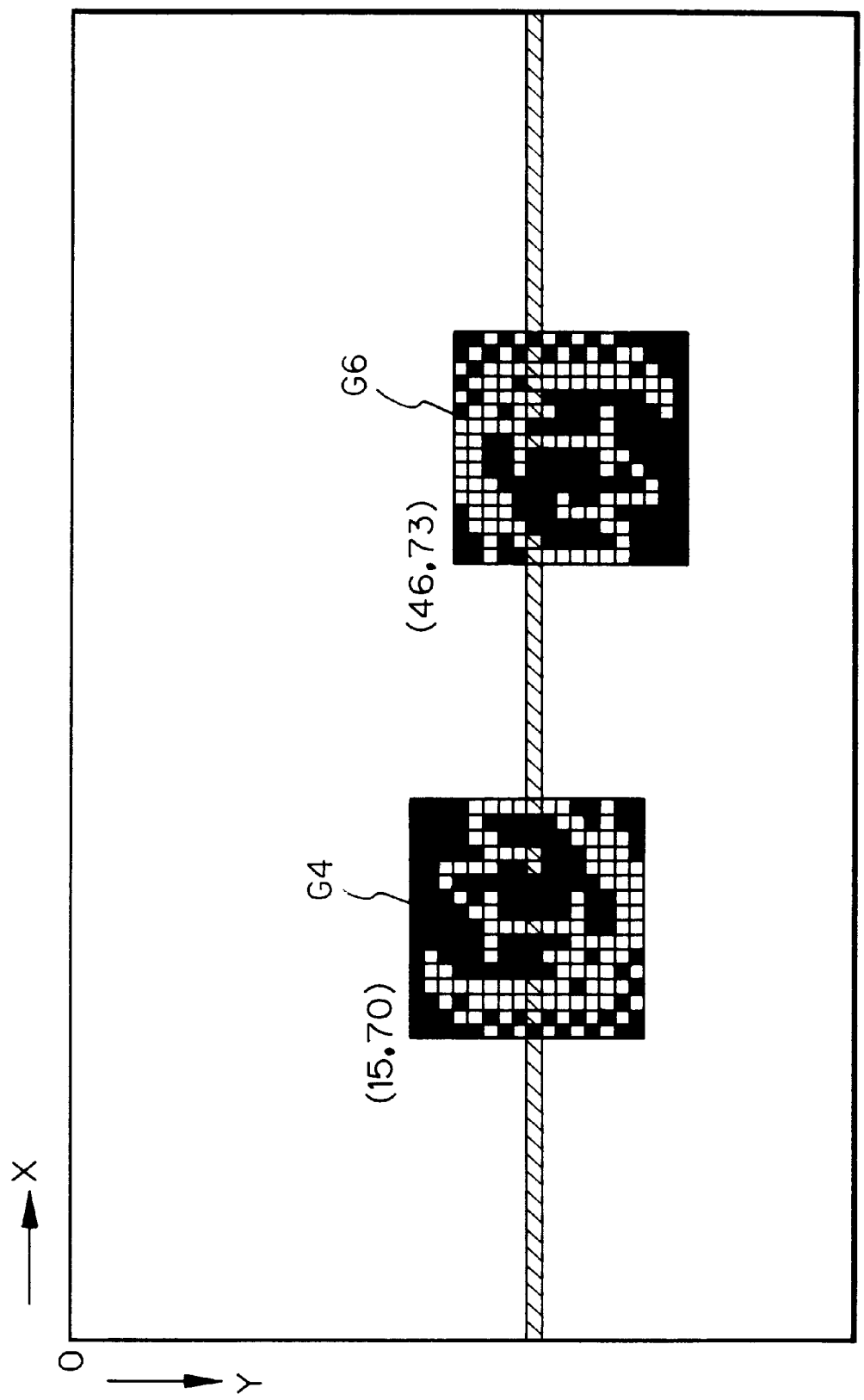
FIG. 29 is an illustration of graphics that can be displayed by the apparatus of FIG. 26.

Note that, at step 503, the CPU 1 also sets a bit UD for each graphic image in the parameter RAM 32". For example, in order to obtain an image as shown in FIG. 29, (X0, Y0, ADD0, RL, UD)=(15(h), 70(h), 20(h), 0(h), 0(h)) for PA=4(h)

(X0, Y0, ADD0, RL, UD)=(46(h), 73(h), 20(h), 1(h), 1(h)) for PA=6(h).

Also, at step 605, the timing generating circuit 34 generates an output request signal RQ and transmits it to the FIFO 33. As a result, the FIFO 33 generates a parameter address PA and transmits it to the parameter RAM 32. For example, as shown in FIG. 26, if the parameter address 4(h) is transmitted to the parameter RAM 32", (X0, Y0, ADD0, RL, UD)=(15(h), 70(h), 20(h), 0(h), 0(h)) is generated from the parameter RAM 32". As a result, the ROM address calculating circuit 35 calculates a ROM address ADD by ADD=20(h)+78(h)−70(h)

=28(h)

Also, since UD="0", ADD"=ADD=28(h).

In addition, since the bit RL. is "0", the output C2 of the converter 375 is the same as the output C1 of the counter 372, so that the output C2 is 0, 1, . . . , F(h). Therefore, for graphic image G4 and Y=78(h) shown in FIG. 29, the dot selector 374 outputs the graphic data stored therein in the order of from lower to upper dots (1000111011100110). In this case, since the X origin coordinate X0 is 15, the dot address X changed by the line buffer address counter 373 is 15, 16, . . . , 24. Thus, the display data DA (1000111011100110) is transmitted to the line buffer 2 in synchronization with the dot address X (15, 16, . . . , 24). Similarly, if the parameter address 6(h) is transmitted to the parameter RAM 32", (X0, Y0, ADD0, RL, UD)=(46(h), 73(h), 20(h), 1(h), 1(h)) is generated from the parameter RAM 32". As a result, the ROM address calculating circuit 35 calculates a ROM address ADD by ADD=20(h)+78(h)−73(h)

=25(h)

Also, since UD="1", ADD'=2A(h).

In addition, since the bit RL is "1", the output C2 of the converter 375 is opposite to the output C1 of the counter 372, so that the output C2 is F, E, . . . , 0(h). Therefore, for graphic image G6 and Y=78(h) shown in FIG. 29, the dot selector 374 outputs the graphic data stored therein in the order of from upper to lower dots (0011111101000001). In this case, since the X origin coordinate X0 is 46, the dot address X changed by the line buffer address counter 373 is 46, 47, . . . , 55. Thus, the display data DA (0011111101000001) is transmitted to the line buffer 2 in synchronization with the dot address X (46, 47, . . . , 55).

Note that the converter 38 of FIG. 26 can be introduced into the apparatuses of FIGS. 19 and 23 simultaneously with the replacement of the parameter RAM 32' with the parameter RAM 32" of FIG. 26.

As explained hereinabove, according to the present invention, since use is made of either or both of a data alteration means for altering the output order of pixel dots of graphic image data or line buffer address alteration means, the data for a graphic to be displayed and the data for an inverted graphic thereof do not need to be mapped on a graphic ROM as independent sets of data so that the necessary capacity of the graphic ROM can be greatly reduced.

Meanwhile, as data are handled on a dot by dot basis, it is now possible to invert or replace selected dots in the original graphic and display only selected dots of the original graphic.

What is claimed is:

1. A graphic image display apparatus comprising:
a CPU;
a line buffer for temporarily storing graphic data for display; and
a display control circuit connected between said CPU and said line buffer, said display control circuit comprising,
a graphic ROM for storing image source data for graphics to be displayed, said graphic ROM being designed and adapted to output graphic data for display in response to an interface signal of said CPU, and
an output circuit connected to said graphic ROM and having a data dot selecting means for changing a dot order of said graphic data for display,
said output circuit being connected between said line buffer and said graphic ROM,
said display control circuit being designed and adapted to selectively vertically invert said output graphic data for display, and to selectively horizontally invert said output graphic data for display independently of the selective vertical inversion,
said data dot selecting means comprising a counter for generating an ordinary order of dot addresses, and a converter connected between said counter and a dot selector for inverting said ordinary order of dot addresses to generate an inverted order of dot addresses in response to a right/left inverting signal,
said dot selector being connected between said graphic ROM and said line buffer for selecting dots of said graphic data for display in accordance with one of said ordinary order and said inverted order.

2. The apparatus as set forth in claim 1, wherein said display control circuit further comprises a ROM address calculating circuit and a converter, said converter being connected between said ROM address calculating circuit and said graphic ROM for inverting an address of said ROM.

3. A graphic image display apparatus comprising:
a CPU;
a line buffer for temporarily storing graphic data for display; and
a display control circuit connected between said CPU and said line buffer, said display control circuit comprising,
a graphic ROM for storing image source data for graphics to be displayed, said graphic ROM being designed and adapted to output graphic data for display in response to an interface signal of said CPU, and
an output circuit connected to said graphic ROM and having a line buffer address changing means for changing a line buffer address representing a storage address of said graphic data for display to be supplied to said line buffer,
said output circuit being connected between said line buffer and said graphic ROM,
said display control circuit being designed and adapted to selectively vertically invert said output graphic data for display, and to selectively horizontally invert said output graphic data for display independently of the selective vertical inversion,
said line buffer address changing means comprising a converter for converting an X origin coordinate of said graphic data for display into a right end of said graphic data for display; and
a selector connected between said converter and an up/down counter for selecting one of said X origin coordinate and said right end of said graphic data for display,
said up/down counter being connected between said selector and said line buffer for incrementing said line buffer address from said X origin coordinate in response to a first state of a right/left inverting signal, and decrementing said line buffer address from said right end in response to a second state of said right/left inverting signal.

4. A graphic image display apparatus comprising:
a CPU;
a line buffer for temporarily storing graphic data for display;

a display control circuit connected between said CPU and said line buffer, said display control circuit comprising
a graphic ROM for storing graphic image source data for graphics to be displayed, said graphic ROM being designed and adapted to output graphic data for display in response to an interface signal of said CPU, and
an output circuit connected to said graphic ROM and having a line buffer address changing means for changing a line buffer address representing a storage address of said graphic data for display to be supplied to said line buffer,
wherein said line buffer address changing means comprises
a counter for generating an ordinary order of dot addresses,
a converter, connected to said counter, for inverting said ordinary order of dot addresses to generate an inverted order of dot addresses in response to a right/left inverting signal, and
an adder, connected to said converter, for incrementing said line buffer address from said X origin coordinate by adding said ordinary order of dot addresses to said X origin coordinate in response to a first state of a right/left inverting signal, and decrementing said line buffer address from said X origin coordinate plus a maximum value of said inverted order of dot addresses by adding said inverted order of dot addresses to said X origin coordinate.

5. A graphic image display apparatus comprising:
a CPU;
a line buffer for temporarily storing graphic data for display; and
a display control circuit connected between said CPU and said line buffer, said display control circuit comprising,
a graphic ROM for storing graphic image source data for graphics to be displayed, said graphic ROM being designed and adapted to output graphic data for display in response to an interface signal of said CPU,
an output circuit connected to said graphic ROM and having a line buffer address changing means for changing a line buffer address representing a storage address of said graphic data for display to be supplied to said line buffer,
a data interface, connected to said CPU,
a parameter RAM, connected to said data interface, for storing an X origin coordinate and a Y origin coordinate of said graphic data for display, an origin ROM address of said graphic ROM for showing said source data, and right/left inverting data,
a FIFO read-write memory, connected between said interface and said parameter RAM, for inputting addresses of said parameter RAM from said CPU and outputting said addresses of said parameter RAM to said parameter RAM in response to a request signal,
a timing generating circuit, connected to said FIFO read-write memory, for counting horizontal synchronization signals upon receipt of a vertical synchronization signal to generate a scan line count signal while generating said request signal and a display start signal, and
a ROM address calculating circuit, connected to said parameter RAM and said timing generating circuit, for calculating an address of said graphic ROM in accordance with said origin ROM address, said scan line count signals, and said Y origin coordinate,
said graphic ROM being connected to said ROM address calculating circuit and generating said graphic data accessed by said address of said graphic ROM for said output circuit.

6. A graphic image display apparatus comprising:
a CPU;
a line buffer for temporarily storing graphic data for display; and
a display control circuit connected between said CPU and said line buffer, said display control circuit comprising,
a converter for receiving a ROM address to convert said ROM address into an inverted ROM address in response to an up/down inverting signal,
a graphic ROM, connected to said converter, for storing image source data for graphics to be displayed, said graphic ROM being designed and adapted to output graphic data for display in response to an interface signal of said CPU, and
an output circuit connected to said graphic ROM and said line buffer.

7. The apparatus of claim 6, wherein said output circuit is connected between said line buffer and said graphic ROM.

8. The apparatus of claim 7 wherein said display control circuit is designed and adapted to selectively vertically invert said output graphic data for display, and to selectively horizontally invert said output graphic data for display independently of the selective vertical inversion.

9. A graphic image display apparatus comprising:
a CPU;
a line buffer for temporarily storing graphic data for display; and
a display control circuit connected between said CPU and said line buffer, said display control circuit comprising,
a converter for receiving a ROM address to convert said ROM address into an inverted ROM address in response to an up/down inverting signal,
a graphic ROM, connected to said converter, for storing image source data for graphics to be displayed, said graphic ROM being designed and adapted to output graphic data for display in response to an interface signal of said CPU,
an output circuit connected between said graphic ROM and said line buffer,
a data interface, connected to said CPU,
a parameter RAM, connected to said data interface, for storing an X origin coordinate and a Y origin coordinate of said graphic data for display, an origin ROM address of said graphic ROM for showing said source data, and up/down inverting data,
a FIFO read-write memory, connected between said interface and said parameter RAM, for inputting addresses of said parameter RAM from said CPU, and for outputting said addresses of said parameter RAM to said parameter RAM in response to a request signal,
a timing generating circuit, connected to said FIFO read-write memory, for counting horizontal synchronization signals upon receipt of a vertical synchronization signal to generate a scan line count signal while generating said request signal and a display start signal, and
a ROM address calculating circuit, connected to said parameter RAM, said converter and said timing generating circuit, for calculating an address of said graphic ROM in accordance with said origin ROM address, said scan line count signal, and said Y origin coordinate,
said graphic ROM being connected to said converter and generating said graphic data accessed by one of said graphic ROM address and said inverted graphic ROM address, said graphic data being provided to said output circuit.

* * * * *